US012641473B2

(12) United States Patent
Tang et al.

(10) Patent No.: US 12,641,473 B2
(45) Date of Patent: May 26, 2026

(54) METHOD, DEVICE AND COMPUTER-READABLE MEMORY FOR COMMUNICATIONS WITHIN A RADIO ACCESS NETWORK

(71) Applicant: Huawei Technologies Co., Ltd., Shenzhen (CN)

(72) Inventors: Hao Tang, Ottawa (CA); Liqing Zhang, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 100 days.

(21) Appl. No.: 18/526,018

(22) Filed: Dec. 1, 2023

(65) Prior Publication Data

US 2024/0107360 A1     Mar. 28, 2024

Related U.S. Application Data

(63) Continuation of application No. PCT/CN2021/098148, filed on Jun. 3, 2021.

(51) Int. Cl.
H04W 28/02          (2009.01)

(52) U.S. Cl.
CPC ...  *H04W 28/0252* (2013.01); *H04W 28/0268* (2013.01)

(58) Field of Classification Search
CPC ..................... H04W 28/0252; H04W 28/0268
USPC ......................................................... 709/238
See application file for complete search history.

(56) References Cited

U.S. PATENT DOCUMENTS

| | | | |
|---|---|---|---|
| 10,277,515 B2 | 4/2019 | Faccin et al. | |
| 11,076,313 B2 * | 7/2021 | Chen ................. | H04W 28/0205 |
| 11,146,996 B2 * | 10/2021 | Sharma ................. | H04W 48/20 |
| 2017/0013610 A1 * | 1/2017 | Lee ......................... | H04W 72/21 |
| 2017/0257876 A1 * | 9/2017 | Loehr .................. | H04L 5/0044 |
| 2018/0020377 A1 * | 1/2018 | Nakano ................. | H04W 28/10 |

(Continued)

FOREIGN PATENT DOCUMENTS

| | | |
|---|---|---|
| CN | 108781381 A | 11/2018 |
| JP | 2024516694 A | 4/2024 |

(Continued)

OTHER PUBLICATIONS

Huawei et al:"Discussion on QoE measurement configuration and reporting." 3GPP TSG RAN WG2 #113bis-e R2-2103910. Apr. 12-20, 2021. total 4 pages.

(Continued)

*Primary Examiner* — Wing F Chan
*Assistant Examiner* — John Fan
(74) *Attorney, Agent, or Firm* — Slater Matsil, LLP

(57)          ABSTRACT

A communication method, a communication device and a non-transitory computer readable memory are provided for generating a first message only within a radio access network (RAN) of the wireless communication network and for communicating the first message in a radio bearer (RB) with a second communication device within the RAN. The first message is associated with a first message type, a priority of the first message type being lower than a priority of a second message having second message type communicated via a core network (CN) of the wireless communication network. The first message can comprise control signaling or data.

18 Claims, 13 Drawing Sheets

(56)                  References Cited

U.S. PATENT DOCUMENTS

| | | | |
|---|---|---|---|
| 2019/0342932 A1 * | 11/2019 | Futaki | H04W 76/16 |
| 2020/0045767 A1 | 2/2020 | Velev et al. | |
| 2020/0195521 A1 | 6/2020 | Bogineni et al. | |
| 2021/0136659 A1 | 5/2021 | Ianev et al. | |

FOREIGN PATENT DOCUMENTS

| | | | |
|---|---|---|---|
| WO | WO-2018141945 A1 * | 8/2018 | H04L 47/2408 |
| WO | 2021064046 A1 | 4/2021 | |
| WO | 2022240687 A1 | 11/2022 | |

OTHER PUBLICATIONS

3GPP TSG-RAN WG2 Meeting #98 R2-1705110, "QMC agreements analysis in E-UTRAN", Nokia, Alcatel-Lucent Shanghai Bell, Hangzhou, China, May 15-19, 2017, total 3 pages.

"3rd Generation Partnership Project; Technical Specification Group Radio Access Network; NR; Medium Access Control (MAC) protocol specification (Release 16)", 3GPP TS 38.321 V16.0.0, Technical Specification, (Mar. 2020), 141 Pages.

Huawei, "3E2E delay measurement for QoS monitoring for URLLC," 3GPP TSG-RAN3 Meeting #107-e, R3-200485, Athens, Greece, Feb. 24-28, 2020, 15 pages.

* cited by examiner

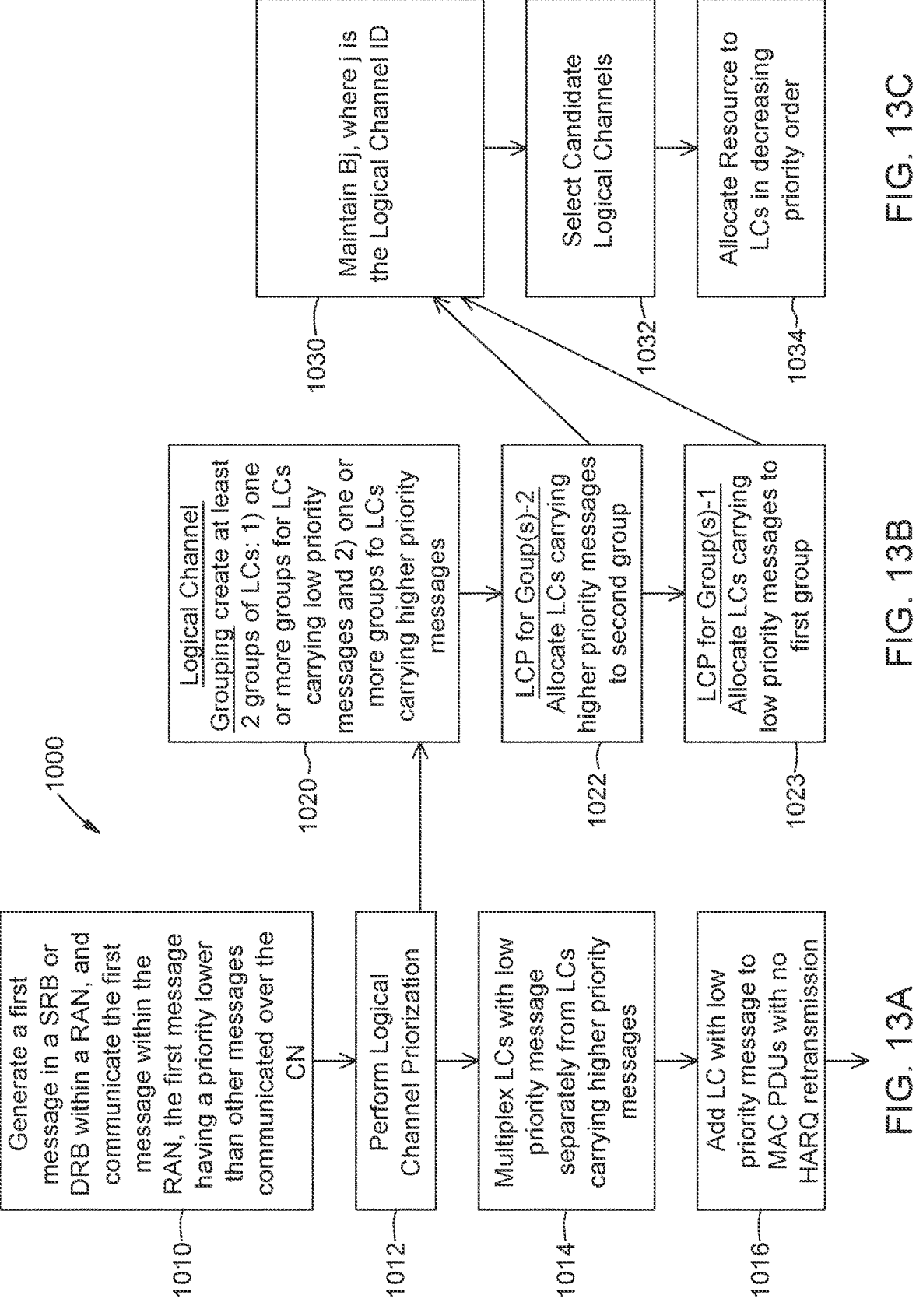

Maintain Bj, where j is the Logical Channel ID — 1030

Select Candidate Logical Channels — 1032

Allocate Resource to LCs in decreasing priority order — 1034

FIG. 13C

Logical Channel Grouping Create at least 2 groups of LCs: 1) one or more groups for LCs carrying low priority messages and 2) one or more groups fo LCs carrying higher priority messages — 1020

LCP for Goup(s)-2 Allocate LCs carrying higher priority messages to second group — 1022

LCP for Goup(s)-1 Allocate LCs carrying low priority messages to first group — 1023

FIG. 13B

Generate a first message in a SRB or DRB within a RAN, and communicate the first message within the RAN, the first message having a priority lower than other messages communicated over the CN — 1010

Perform Logical Channel Priorization — 1012

Multiplex LCs with low priority message separately from LCs carrying higher priority messages — 1014

Add LC with low priority message to MAC PDUs with no HARQ retransmission — 1016

METHOD, DEVICE AND COMPUTER-READABLE MEMORY FOR COMMUNICATIONS WITHIN A RADIO ACCESS NETWORK

CROSS-REFERENCE TO RELATED APPLICATIONS

This application is a continuation of International Application No. PCT/CN2021/098148, filed on Jun. 3, 2021, application of which is hereby incorporated by reference in its entirety.

TECHNICAL FIELD

The present disclosure relates to the field of mobile communications and more specifically relates to a method and to a device for communications of within a radio access network (RAN) of a wireless communication network.

BACKGROUND

New Radio (NR) is a radio access technology widely available since the deployment of the fifth generation (5G) of mobile networks. NR introduced the separation of user traffic data and signaling traffic data, by managing them separately in a User Plane (UP) and a Control Plane (CP). The UP and CP protocol stacks are shown in FIG. 1A and FIG. 1B.

In the UP, the Service Data Application Protocol (SDAP) layer is standardized for the handling of Quality of Service (QoS). The Core Network (CN) is aware of the service requirements for the different QoS, and the packets are marked with a QoS Flow Identifier (QFI), indicating how they should be handled by the data link layer. One type of QFI is the 5G QoS Identifier (5QI). The 5QI is used to indicate how packets marked with a specific QoS should be handled with regard to their forwarding behavior and/or treatment. In other words, the QoS and the associated 5QI determines the transmission parameters according to which the different packets are to be handled. The SDAP protocol maps the IP packets to the different radio bearers according to the QoS requirement indicated by the 5QI and configures the Logical Channel Priority (LCP) according to the QoS requirement in the Medium Access Layer (MAC) layer.

In the MAC layer, to support priority handling, multiple LCs can be multiplexed into one transport channel, i.e. within a MAC Protocol Data Unit (PDU). As shown in FIG. 2, a logical channel is configured with a priority, and according to the LCP (Logical Channel Prioritization) procedure, the LC with the highest priority is the first to be included into the MAC PDU.

As for the CP, there is currently no QoS handling mechanism available for this plane and the priority of Logical Channels (LCs) in the CP is dependent of the implementation specificities of each network.

SUMMARY

The present disclosure relates to communication methods and devices that can handle more efficiently communications having different transmission priorities based on different message types, thus enabling QoS handling for the new best effort service and enabling high transmission priority for the regular service.

According to an aspect, there is provided a communication method in a wireless communication network. The method comprises generating a first message in a first communication device only within a radio access network (RAN) of the wireless communication network. The method also comprises communicating, by the first communication device, the first message in a radio bearer (RB) with a second communication device, which is also only within the RAN. The first message is associated with a first message type, where a priority of the first message type is lower than a priority of a second message having second message type communicated via a core network (CN) of the wireless communication network. The first message can be any one of control signaling or data.

In a possible implementation of the method, the first message is communicated without performing hybrid automatic repeat request (HARQ). Communicating the first message with no HARQ retransmission can reduce air interface overhead.

In a possible implementation of the method, if the first message is control signaling, the first message is transmitted in a first signaling radio bearer (SRB). The first SRB can be one of a dedicated SRB or group common SRB. The priority of the first SRB can be lower than a priority of any one of SRB0 to SRB3. In addition, a priority of the logical channels (LCs) in the first SRB can be lower than a priority of LCs in any one of SRB0 to SRB3.

In a possible implementation of the method, if the first message is data, the first message is transmitted in a first data radio bearer (DRB). The first DRB can be one of a dedicated DRB or group common DRB.

Advantageously, for communications over the user plane, QoS handling can be reused in the SDAP layer. For communications over the control plane, a new QoS handling can be added.

In a possible implementation, the method may comprise multiplexing, by the first communication device, the first message on the RB into a first transport channel. The first transport channel may comprise any one of: an uplink shared channel (UL-SCH); a downlink shared channel (DL-SCH); a specific uplink shared channel (UL-SCH-S); a specific downlink shared channel (DL-SCH-S); a sidelink shared channel (SL-SCH); a specific sidelink shared channel (SL-SCH-S).

In a possible implementation, the method may further comprise communicating, by the first communication device, an uplink scheduling request (SR) with the second communication device. Advantageously, an uplink SR resource can be dedicated for the first message type.

In a possible implementation of the method, the LC for communicating the first message is part of a first group of LCs on which no HARQ is performed, and the LC for communicating the second message is part of a second group of LCs on which HARQ is performed. HARQ retransmission can thus only be performed when needed, such as on messages having higher transmission requirements compared to message of the first type. Optionally, the LCs of the second group can be transmitted with a higher priority order than LCs of the first group. As can be appreciated, the logical channel prioritization process can be performed separately (or independently) for the messages having higher priority transmission requirements and for messages having ultralow or best effort transmission requirements, as per the first message type.

In a possible implementation, the method may comprise multiplexing the LCs of the first group in MAC PDU(s) without performing HARQ. The LCs of the second group are multiplexed in MAC PDU(s) and HARQ on said MAC PDU(s) is performed. As can be appreciated, multiplexing is performed separately for the LCs of the first group and of the second group.

As can be appreciated, there may be no HARQ retransmission on LCs carrying messages of the first message type, while ARQ may be performed for other message types.

In a possible implementation of the method, the first message type can be associated with a first type of quality of service (QoS). The transmission requirements of the first type of QoS can be lower than the transmission requirements of the first type QoS for the second message type. The first type QoS can be defined by at least one of: packet loss rate, packet delay budget, scheduling weights, admission thresholds, queue management thresholds, link layer protocol configuration, reliability and throughput. As can be appreciated, messages of the first type which may not be sensitive to packet loss and/or delay can be transmitted with low priority or best effort service, while messages of different types, requiring higher QoS, can still be transmitter with higher transmission priority, as is the case with existing regular service(s).

In a possible implementation, the LCs can be configured using various parameters. The LCs can be configured using an HARQ-allowed parameter which can be set to true or false, the HARC-allowed parameter being set to false for LCs of the first group. A priority parameter can also be configured for the LCs. The priority parameter can be an integer having a value from 1 to N, where a higher value means a lower priority. The LCs of the first group can be configured with corresponding priority parameters having higher values compared to values of the priority parameters used for LCs of the second group. Optionally, the values used for the priority parameter of LCs of the first group can be part of a subset values that are predefined or configured by the network. It is also possible to configure the LCs of the first group using a prioritizedBitRate (PBR) parameter, which can be set to kBps8 or less. Yet according to another option, the LCs of the first group can be configured using a BucketSizeDuration (BSD) parameter, which can be set to ms10 or less. The assignment or allocation of the first message to the LCs of the first group can thus be performed based on at least one of: the HARQ-allowed parameter, priority parameter, PBR parameter and BSD parameter.

According to another aspect, a communication device is provided. The communication device comprises at least one processor and a non-transitory computer readable storage medium, operatively coupled to the at least one processor. The non-transitory computer readable medium stores programming (or instructions executable by the one or more processor), for causing the communication device to generate a first message only within a radio access network (RAN) of the wireless communication network. The programming also causes the device to communicate the first message in a radio bearer (RB) with a second communication device within the RAN. The first message is associated with a first message type, where the priority of the first message type is lower than a priority of a second message having second message type, the second message being communicated via a core network (CN) of the wireless communication network. The first message can be any one of control signaling or data.

In possible embodiments of the device, the non-transitory computer readable medium further stores programming for execution by the one or more processors, to cause the communication device to execute additional and/or optional steps of the method as defined above.

According to another aspect, a non-transitory computer readable memory is provided. The memory comprises instructions stored thereon to cause a processor to execute the method as defined above.

As can be appreciated, local control signaling and data delivery, as well as QoS handling for messages of the first type is enabled by the proposed method, communication device and non-transitory computer readable memory.

BRIEF DESCRIPTION OF THE DRAWINGS

Other objects, advantages and features will become more apparent upon reading the following non-restrictive description of embodiments and implementations thereof, given for the purpose of exemplification only, with reference to the accompanying drawings in which:

FIG. 13A is a flow diagram of a communication method, according to a possible implementation. FIG. 13B is a flow diagram of an LCP process, according to a possible implementation. FIG. 13C is a flow diagram of an allocation method for LCs part of a same group, according to a possible implementation.

DETAILED DESCRIPTION

Figures 1A, 1B:
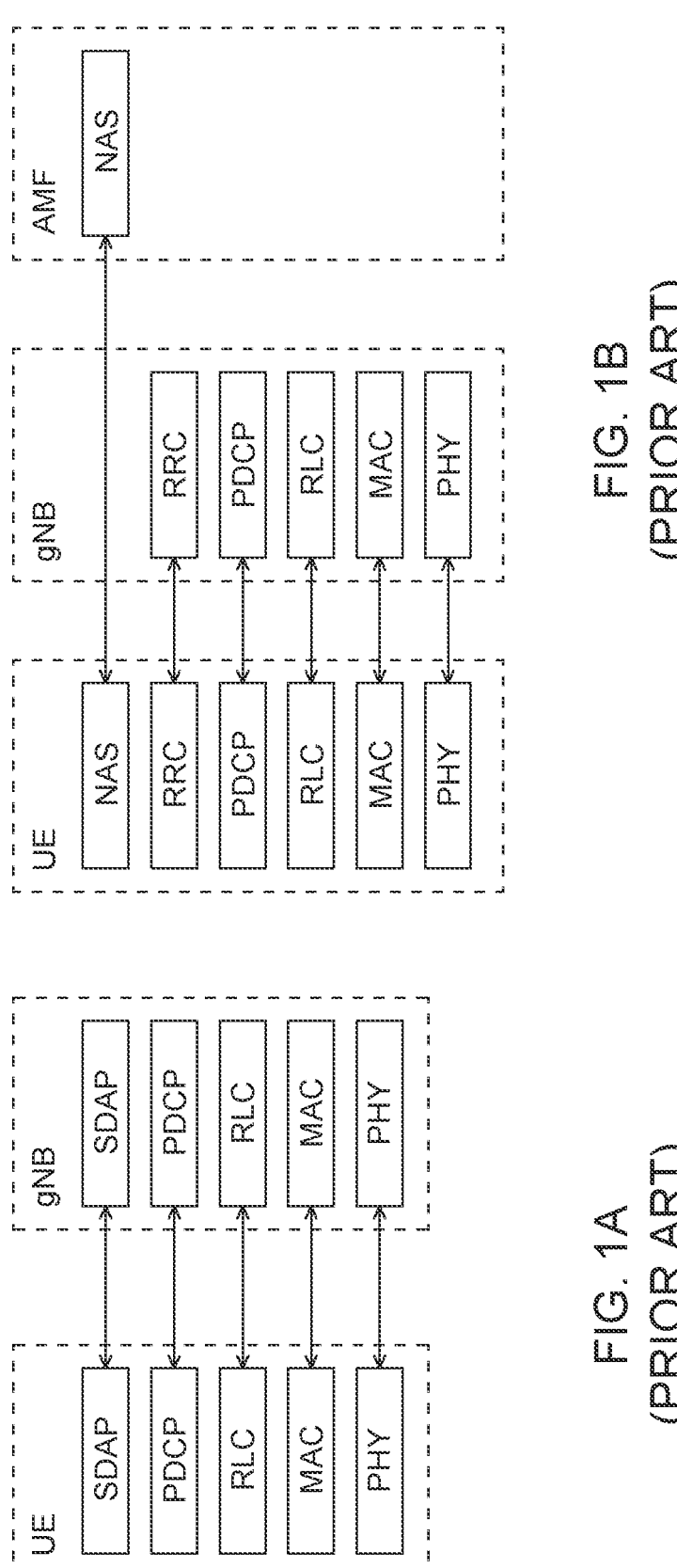
FIG. 1A is a schematic diagram of a User Plane (UP) protocol stack architecture of a next generation mobile communication network.
FIG. 1B is a schematic diagram of a Control Plane (CP) protocol stack architecture of a next generation mobile communication network.
Figure 2:
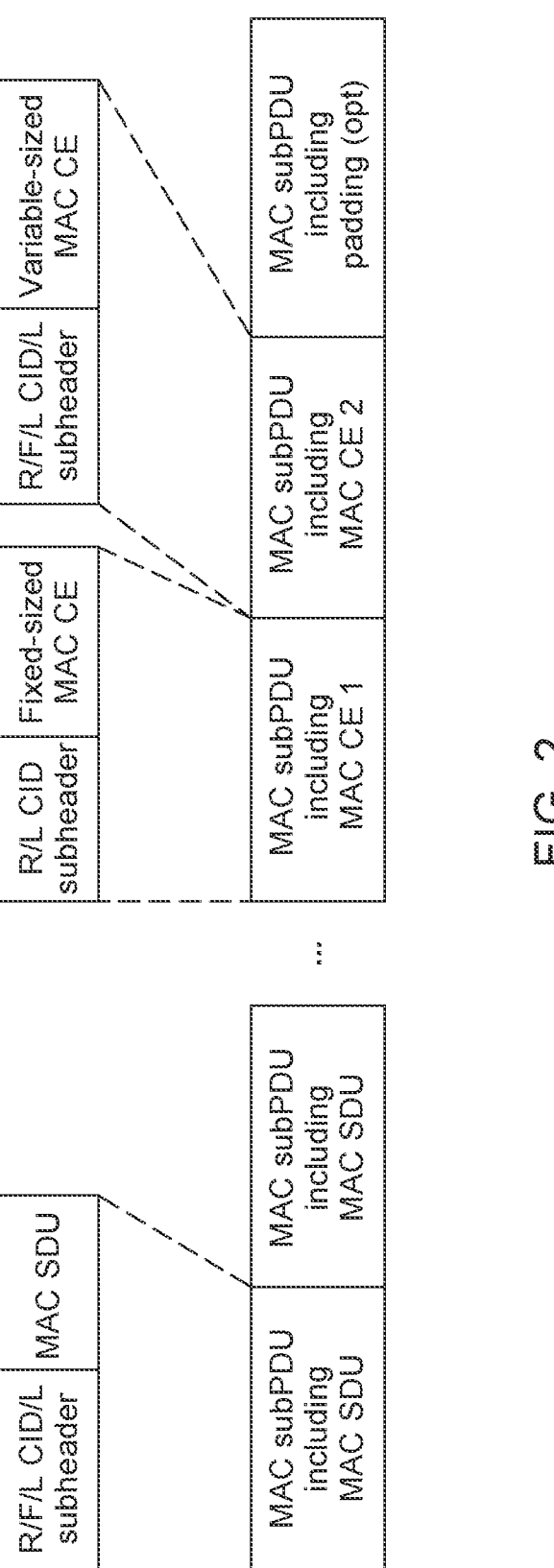
FIG. 2 is schematic illustration of a Logical Channel Prioritization (LCP) process, in the MAC sublayer.

In next generations of wireless communication networks, including for example the sixth generation (6G), it is contemplated to provide for communications of messages within Radio Access Network(s) (RAN). These messages, which will typically comprise local traffic signaling or data, and referred to as first messages, are associated with a new message type, referred to as a first message type. The priority of the messages of the first message type is lower than the priority of other messages having different message types—including for example a second message type—
where these other messages are communicated via the core
network (CN) of the wireless communication network. In
possible implementations, the messages types having a
higher priority than the first message type may correspond to
traditional communication services already available with
5G.

In possible implementations, messages of the first mes-
sage type may comprise different data such as sensing data
(environment data collection), virtual and augmented reality
data (VR/AR), ubiquitous or pervasive instant communica-
tion data, AI training data, AI intermediate training results
data, and the like. Alternatively, messages of the first mes-
sage type may comprise traffic signaling. Messages of the
first message type may be associated with a first type of
Quality of Service (QoS), such as a best effort or ultra-low
QoS, with transmission requirements even lower than the
lowest requirement in currently existing communications.
The transmission requirements of the first type of QoS can
thus be lower than transmission requirements of the QoS for
the messages of the second type. In other words, the QoS
transmission requirements of the first type of QoS can be
lower than transmission requirements of the first type QoS
of the second message type. For example, the first message
may have specific QoS requirements, such as a Block Error
Ratio (BLER) or a given throughput. The first type of QoS
can thus correspond to BLER or throughput, as examples
only. Taking BLER as an example, for the first message type,
the requirement may be that BLER should be smaller than
0.2 (BLER<0.2); while for the second message type, BLER
can be smaller than 0.1 (BLER<0.1). Given that the QoS
requirement of the first message type is lower than the QoS
requirement for the second message type, more transmission
errors are allowed when transmitting messages of the first
type. The QoS of the first message type can be defined by at
least one of: packet loss rate, packet delay budget, sched-
uling weights, admission thresholds, queue management
thresholds, link layer protocol configuration, reliability and
throughput. In a possible implementation, messages of the
first message type will be communicated with a best effort
error rate, latency and throughput. In addition, it is contem-
plated to provide the first message type, allowing the com-
munication of first messages, in either one of the CP or UP.

According to a general aspect, a communication method,
a communication device, a computer readable memory and
a MAC structure are provided for the communication of first
messages on next generation wireless networks, such as 6G.
The first messages may comprise control signaling or data,
and consequently can be communicated on the CP or on the
UP, for downlink (DL), uplink (UL) and sidelink (SL)
communications.

Figure 3:
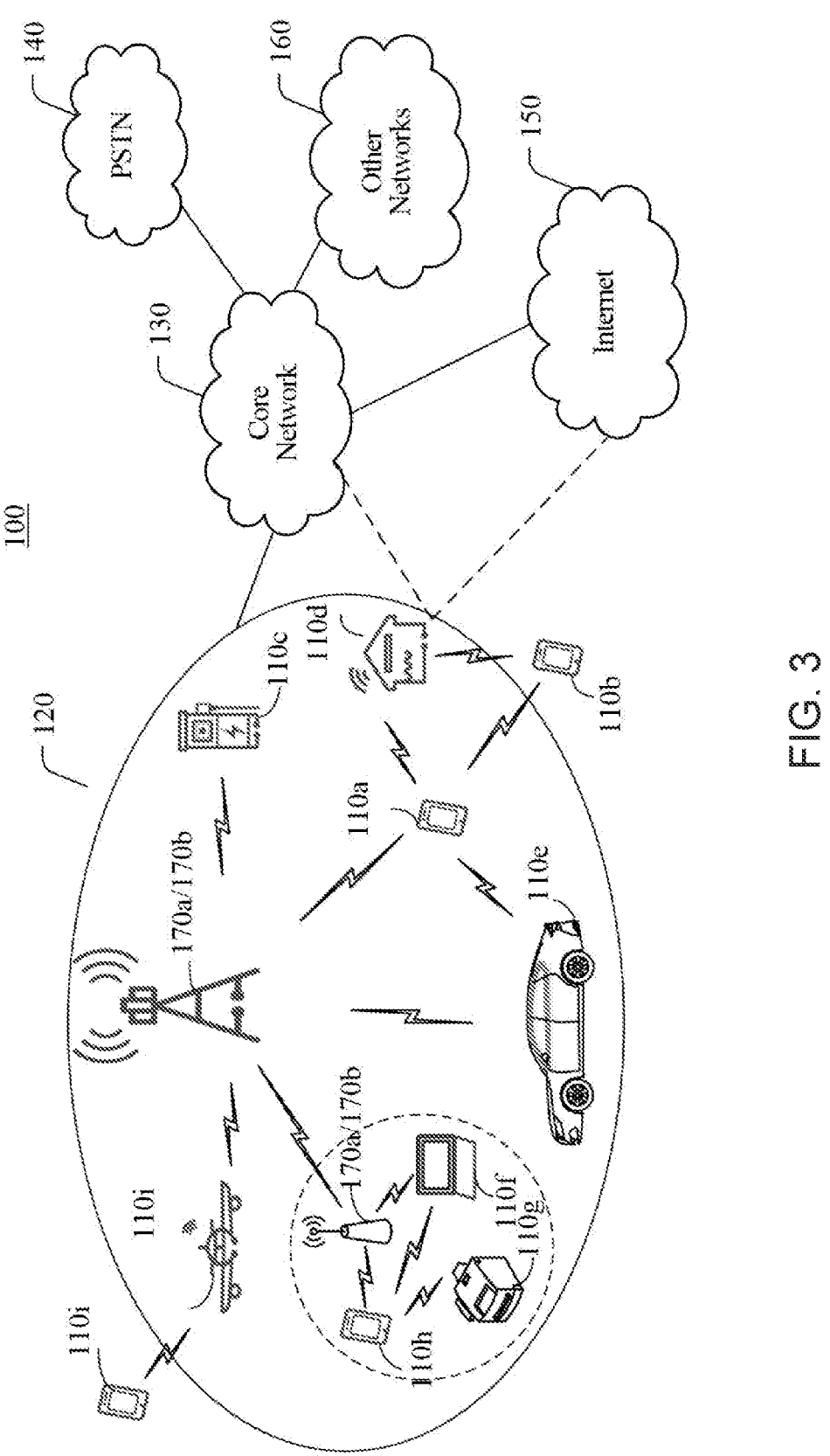
FIG. 3 is a schematic illustration of a communication system, according to a possible implementation.

Referring to FIG. 3, as an illustrative example without
limitation, a simplified schematic illustration of a commu-
nication system is provided. The communication system 100
comprises a radio access network 120. The radio access
network 120 may be a next generation (e.g. sixth generation
(6G) or later) radio access network, or a legacy (e.g. 5G, 4G,
3G or 2G) radio access network. One or more communica-
tion electric device (ED) 110a-120j (generically referred to
as 110, and which may be referred to as communication
devices) may be interconnected to one another or connected
to one or more network nodes (170a, 170b, generically
referred to as 170) in the radio access network 120. A core
network 130 may be a part of the communication system and
may be dependent or independent of the radio access tech-
nology used in the communication system 100. Also the communication system 100 comprises a public switched
telephone network (PSTN) 140, the internet 150, and other
networks 160.

Figure 4:
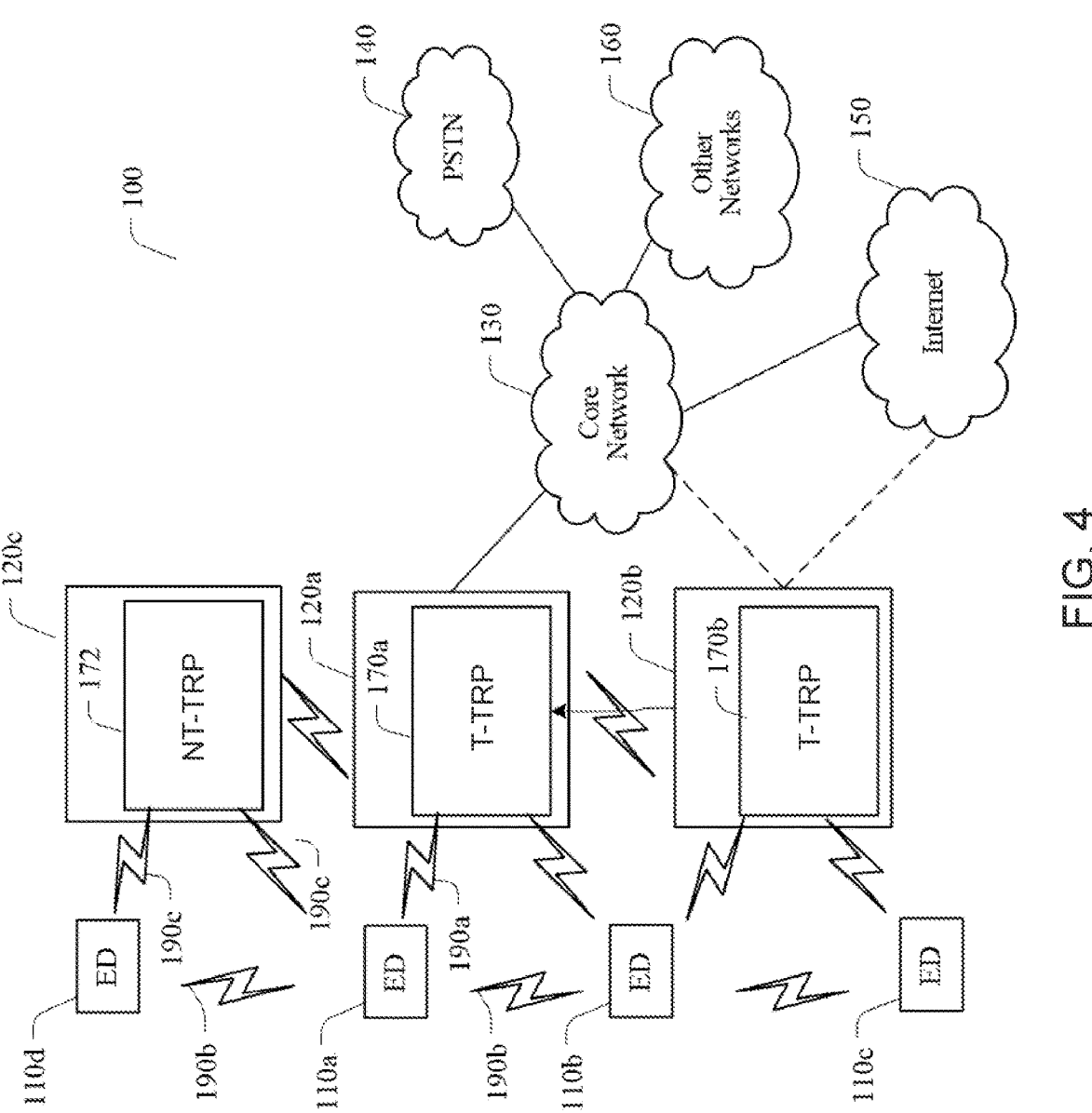
FIG. 4 is another schematic illustration of a communication system, according to a possible implementation.

FIG. 4 illustrates an example communication system 100.
In general, the communication system 100 enables multiple
wireless or wired elements to communicate data and other
content. The purpose of the communication system 100 may
be to provide content, such as voice, data, video, and/or text,
via broadcast, multicast and unicast, etc. The communica-
tion system 100 may operate by sharing resources, such as
carrier spectrum bandwidth, between its constituent ele-
ments. The communication system 100 may include a ter-
restrial communication system and/or a non-terrestrial com-
munication system. The communication system 100 may
provide a wide range of communication services and appli-
cations (such as earth monitoring, remote sensing, passive
sensing and positioning, navigation and tracking, autono-
mous delivery and mobility, etc.). The communication sys-
tem 100 may provide a high degree of availability and
robustness through a joint operation of the terrestrial com-
munication system and the non-terrestrial communication
system. For example, integrating a non-terrestrial commu-
nication system (or components thereof) into a terrestrial
communication system can result in what may be considered
a heterogeneous network comprising multiple layers. Com-
pared to conventional communication networks, the hetero-
geneous network may achieve better overall performance
through efficient multi-link joint operation, more flexible
functionality sharing, and faster physical layer link switch-
ing between terrestrial networks and non-terrestrial net-
works.

The terrestrial communication system and the non-terres-
trial communication system could be considered sub-sys-
tems of the communication system. In the example shown,
the communication system 100 includes electronic devices
(ED) 110a-110d (generically referred to as ED 110), radio
access networks (RANs) 120a-120b, non-terrestrial commu-
nication network 120c, a core network 130, a public
switched telephone network (PSTN) 140, the internet 150,
and other networks 160. The RANs 120a-120b include
respective base stations (BSs) 170a-170b, which may be
generically referred to as terrestrial transmit and receive
points (T-TRPs) 170a-170b. The non-terrestrial communi-
cation network 120c includes an access node 120c, which
may be generically referred to as a non-terrestrial transmit
and receive point (NT-TRP) 172.

Any ED 110 may be alternatively or additionally config-
ured to interface, access, or communicate with any other
T-TRP 170a-170b and NT-TRP 172, the internet 150, the
core network 130, the PSTN 140, the other networks 160, or
any combination of the preceding. In some examples, ED
110a may communicate an uplink and/or downlink trans-
mission over an interface 190a with T-TRP 170a. In some
examples, the EDs 110a, 110b and 110d may also commu-
nicate directly with one another via one or more sidelink air
interfaces 190b. In some examples, ED 110d may commu-
nicate an uplink and/or downlink transmission over an
interface 190c with NT-TRP 172.

The air interfaces 190a and 190b may use similar com-
munication technology, such as any suitable radio access
technology. For example, the communication system 100
may implement one or more channel access methods, such
as code division multiple access (CDMA), time division
multiple access (TDMA), frequency division multiple
access (FDMA), orthogonal FDMA (OFDMA), or single-
carrier FDMA (SC-FDMA) in the air interfaces 190a and
190b. The air interfaces 190a and 190b may utilize other higher dimension signal spaces, which may involve a combination of orthogonal and/or non-orthogonal dimensions.

The air interface 190c can enable communication between the ED 110d and one or multiple NT-TRPs 172 via a wireless link or simply a link. For some examples, the link is a dedicated connection for unicast transmission, a connection for broadcast transmission, or a connection between a group of EDs and one or multiple NT-TRPs for multicast transmission.

The RANs 120a and 120b are in communication with the core network 130 to provide the EDs 110a 110b, and 110c with various services such as voice, data, and other services. The RANs 120a and 120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a and 120b or EDs 110a 110b, and 110c or both, and (ii) other networks (such as the PSTN 140, the internet 150, and the other networks 160). In addition, some or all of the EDs 110a 110b, and 110c may include functionality for communicating with different wireless networks over different wireless links using different wireless technologies and/or protocols. Instead of wireless communication (or in addition thereto), the EDs 110a 110b, and 110c may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110a 110b, and 110c may be multimode devices capable of operation according to multiple radio access technologies and incorporate multiple transceivers necessary to support such.

Figure 5:
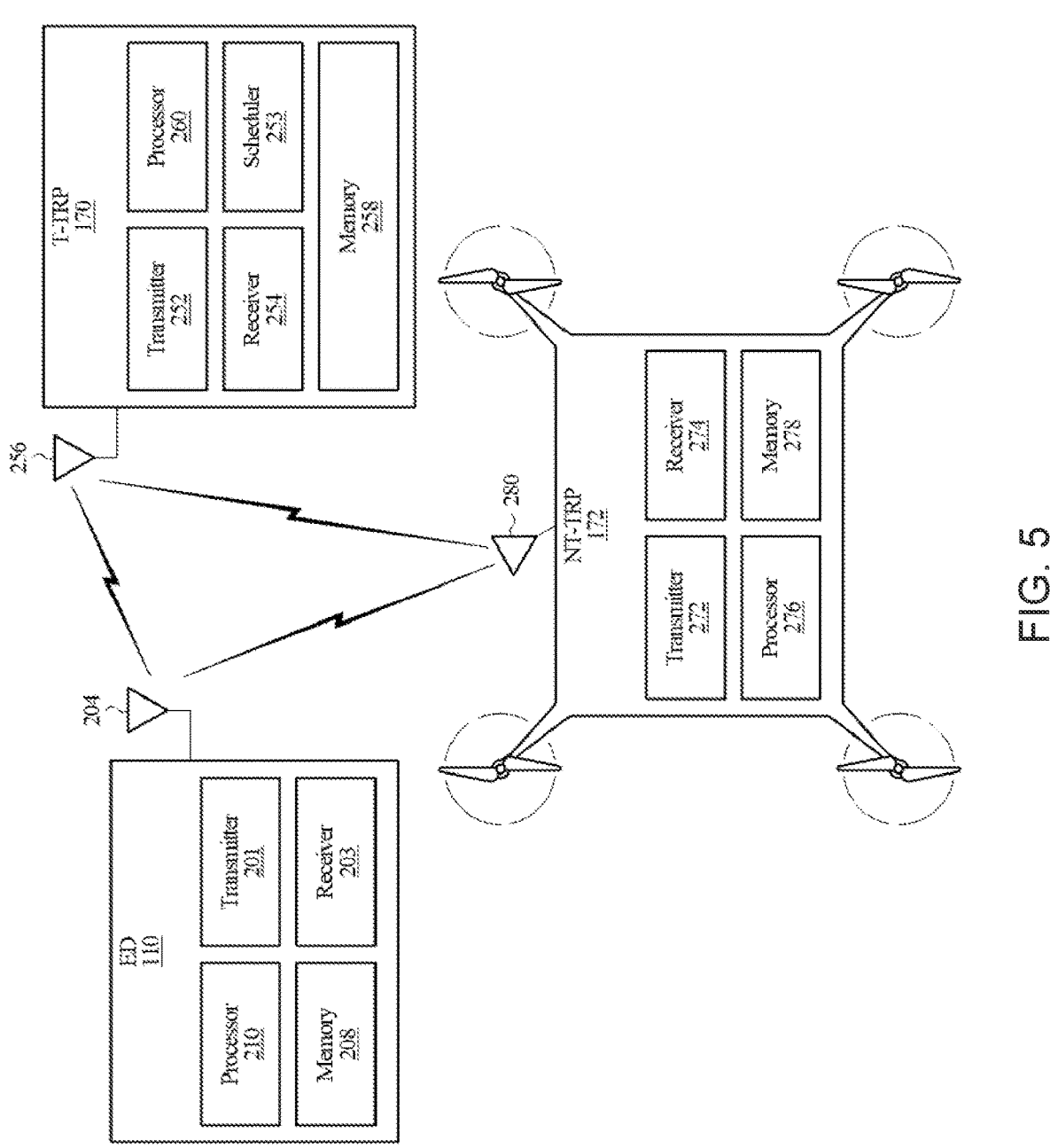
FIG. 5 is a schematic illustration of a communication device, according to a possible embodiment.

FIG. 5 illustrates another example of an ED 110 and a base station 170a, 170b and/or 170c. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), internet of things (IoT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation EDs 110 may be referred to using other terms. The base station 170a and 170b is a T-TRP and will hereafter be referred to as T-TRP 170. Also shown in FIG. 5, a NT-TRP will hereafter be referred to as NT-TRP 172. Each ED 110 connected to T-TRP 170 and/or NT-TRP 172 can be dynamically or semi-statically turned-on (i.e., established, activated, or enabled), turned-off (i.e., released, deactivated, or disabled) and/or configured in response to one of more of: connection availability and connection necessity.

The ED 110 includes a transmitter 201 and a receiver 203 coupled to one or more antennas 204. Only one antenna 204 is illustrated. One, some, or all of the antennas may alternatively be panels. The transmitter 201 and the receiver 203 may be integrated, e.g. as a transceiver. The transceiver is configured to modulate data or other content for transmission by at least one antenna 204 or network interface controller (NIC). The transceiver is also configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 210. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The ED 110 may further include one or more input/output devices (not shown) or interfaces (such as a wired interface to the internet 150 in FIG. 3). The input/output devices permit interaction with a user or other devices in the network. Each input/output device includes any suitable structure for providing information to or receiving information from a user, such as a speaker, microphone, keypad, keyboard, display, or touch screen, including network interface communications.

The ED 110 further includes a processor 210 for performing operations including those related to preparing a transmission for uplink transmission to the NT-TRP 172 and/or T-TRP 170, those related to processing downlink transmissions received from the NT-TRP 172 and/or T-TRP 170, and those related to processing sidelink transmission to and from another ED 110. Processing operations related to preparing a transmission for uplink transmission may include operations such as encoding, modulating, transmit beamforming, and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g. by detecting and/or decoding the signaling). An example of signaling may be a reference signal transmitted by NT-TRP 172 and/or T-TRP 170. In some embodiments, the processor 276 implements the transmit beamforming and/or receive beamforming based on the indication of beam direction, e.g. beam angle information (BAI), received from T-TRP 170. In some embodiments, the processor 210 may perform operations relating to network access (e.g. initial access) and/or downlink synchronization, such as operations relating to detecting a synchronization sequence, decoding and obtaining the system information, etc. In some embodiments, the processor 210 may perform channel estimation, e.g. using a reference signal received from the NT-TRP 172 and/or T-TRP 170.

Although not illustrated, the processor 210 may form part of the transmitter 201 and/or receiver 203. Although not illustrated, the memory 208 may form part of the processor 210.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP)), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distribute unit (DU), positioning node, among other possibilities. The T-TRP 170 may be macro BSs, pico BSs, relay node, donor node, or the like, or combinations thereof. The T-TRP 170 may refer to the forging devices or apparatus (e.g. communication module, modem, or chip) in the forgoing devices.

In some embodiments, the parts of the T-TRP 170 may be distributed. For example, some of the modules of the T-TRP 170 may be located remote from the equipment housing the antennas of the T-TRP 170, and may be coupled to the equipment housing the antennas over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment housing the antennas of the T-TRP 170. The modules may also be coupled to other T-TRPs. In some embodiments, the T-TRP 170 may actually be a plurality of T-TRPs that are operating together to serve the ED 110, e.g. through coordinated multipoint transmissions.

The T-TRP 170 includes at least one transmitter 252 and at least one receiver 254 coupled to one or more antennas 256. Only one antenna 256 is illustrated. One, some, or all of the antennas may alternatively be panels. The transmitter 252 and the receiver 254 may be integrated as a transceiver. The T-TRP 170 further includes a processor 260 for performing operations including those related to: preparing a transmission for downlink transmission to the ED 110, processing an uplink transmission received from the ED 110, preparing a transmission for backhaul transmission to NT-TRP 172, and processing a transmission received over backhaul from the NT-TRP 172. Processing operations related to preparing a transmission for downlink or backhaul transmission may include operations such as encoding, modulating, precoding (e.g. MIMO precoding), transmit beamforming, and generating symbols for transmission.

Processing operations related to processing received transmissions in the uplink or over backhaul may include operations such as receive beamforming, and demodulating and decoding received symbols. The processor 260 may also perform operations relating to network access (e.g. initial access) and/or downlink synchronization, such as generating the content of synchronization signal blocks (SSBs), generating the system information, etc. In some embodiments, the processor 260 also generates the indication of beam direction, e.g. BAI, which may be scheduled for transmission by scheduler 253. The processor 260 performs other network-side processing operations described herein, such as determining the location of the ED 110, determining where to deploy NT-TRP 172, etc. In some embodiments, the processor 260 may generate signaling, e.g. to configure one or more parameters of the ED 110 and/or one or more parameters of the NT-TRP 172. Any signaling generated by the processor 260 is sent by the transmitter 252. Note that "signaling", as used herein, may alternatively be called control signaling. Dynamic signaling may be transmitted in a control channel, e.g. a physical downlink control channel (PDCCH), and static or semi-static higher layer signaling may be included in a packet transmitted in a data channel, e.g. in a physical downlink shared channel (PDSCH).

A scheduler 253 may be coupled to the processor 260. The scheduler 253 may be included within or operated separately from the T-TRP 170, which may schedule uplink, downlink, and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or receiver 254. Also, although not illustrated, the processor 260 may implement the scheduler 253. Although not illustrated, the memory 258 may form part of the processor 260.

The processor 260, the scheduler 253, and the processing components of the transmitter 252 and receiver 254 may each be implemented by the same or different one or more processors that are configured to execute instructions stored in a memory, e.g. in memory 258. Alternatively, some or all of the processor 260, the scheduler 253, and the processing components of the transmitter 252 and receiver 254 may be implemented using dedicated circuitry, such as a FPGA, a GPU, or an ASIC.

Although the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110, processing an uplink transmission received from the ED 110, preparing a transmission for backhaul transmission to T-TRP 170, and processing a transmission received over backhaul from the T-TRP 170. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. In some embodiments, the processor 276 implements the transmit beamforming and/or receive beamforming based on beam direction information (e.g. BAI) received from T-TRP 170. In some embodiments, the processor 276 may generate signaling, e.g. to configure one or more parameters of the ED 110. In some embodiments, the NT-TRP 172 implements physical layer processing, but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or receiver 274. Although not illustrated, the memory 278 may form part of the processor 276.

The processor 276 and the processing components of the transmitter 272 and receiver 274 may each be implemented by the same or different one or more processors that are configured to execute instructions stored in a memory, e.g. in memory 278. Alternatively, some or all of the processor 276 and the processing components of the transmitter 272 and receiver 274 may be implemented using dedicated circuitry, such as a programmed FPGA, a GPU, or an ASIC. In some embodiments, the NT-TRP 172 may actually be a plurality of NT-TRPs that are operating together to serve the ED 110, e.g. through coordinated multipoint transmissions.

The T-TRP 170, the NT-TRP 172, and/or the ED 110 may include other components, but these have been omitted for the sake of clarity.

Figure 6:
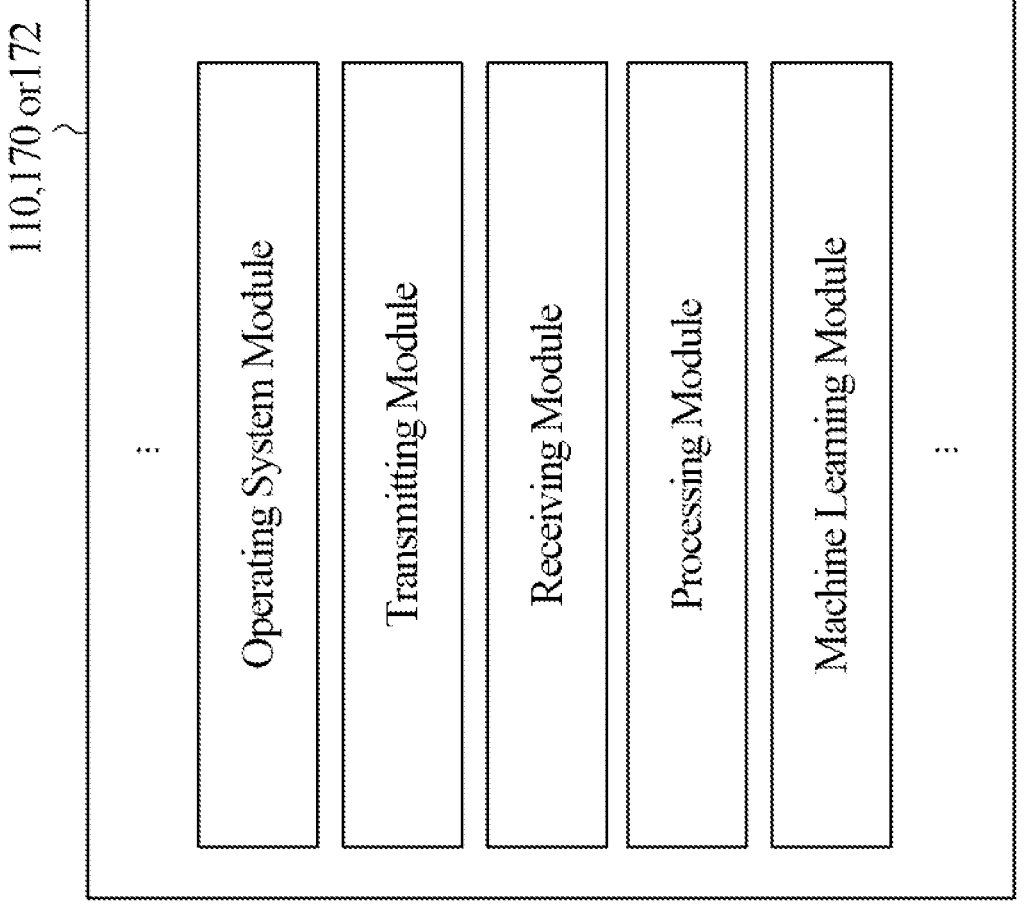
FIG. 6 is a schematic illustration of a communication device, according to a possible embodiment.

According to FIG. 6, one or more steps of the embodiment methods provided herein may be performed by corresponding units or modules. FIG. 6 illustrates units or modules in a communication device, such as in ED 110, in T-TRP 170, or in NT-TRP 172. For example, a signal may be transmitted by a transmitting unit or a transmitting module. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 110, T-TRP 170, and NT-TRP 172 are known to those of skill in the art. As such, these details are omitted here.

As will be appreciated from the following paragraphs, the proposed method, device and structure are based on the fact that a first message is generated in a first communication device, where the first message is only to be communicated within a RAN of a communication network. The first message is communicated by the first communication device in a radio bearer (RB), which can be a Signaling Radio Bearer (SRB) or a Data Radio Bearer (DRB) depending on the content of the first message (i.e. control signaling or data). The first message is to be communicated to a second communication device which is also located within the RAN. The first message is associated with the first message type, where the priority of the first message type is lower than a priority of a second message having second message type, devised to be communicated over the core network (CN) of the wireless communication network. In possible implementations, the first message is communicated without performing Hybrid Automatic Repeat Request (HARQ). Depending on the implementations described below, a communication device can encompass an ED (which may also be referred to as UE) or a base station (such as a T-TRP or NT-TRP), as examples only.

MAC Structure for the First Message Type

For the communication of a first message having a first message type, different options are available. According to possible implementations, the first message, if it comprises control signaling, can be transmitted on the Control Place (CP), using a Signaling Radio Bearer (SRB). The first message can thus be transmitted in a first signaling radio bearer (SRB), where the first SRB is one of a dedicated SRB or group common SRB, where a group common SRB can be shared by multiple communication devices. According to other possible implementations, the first message, if it comprises data, such as described above, can be transmitted on the User Plane (UP) using first data radio bearer (DRB), wherein the first DRB is one of a dedicated DRB or group common DRB, where a group common DRB can be shared by multiple communication devices.

Figure 7:
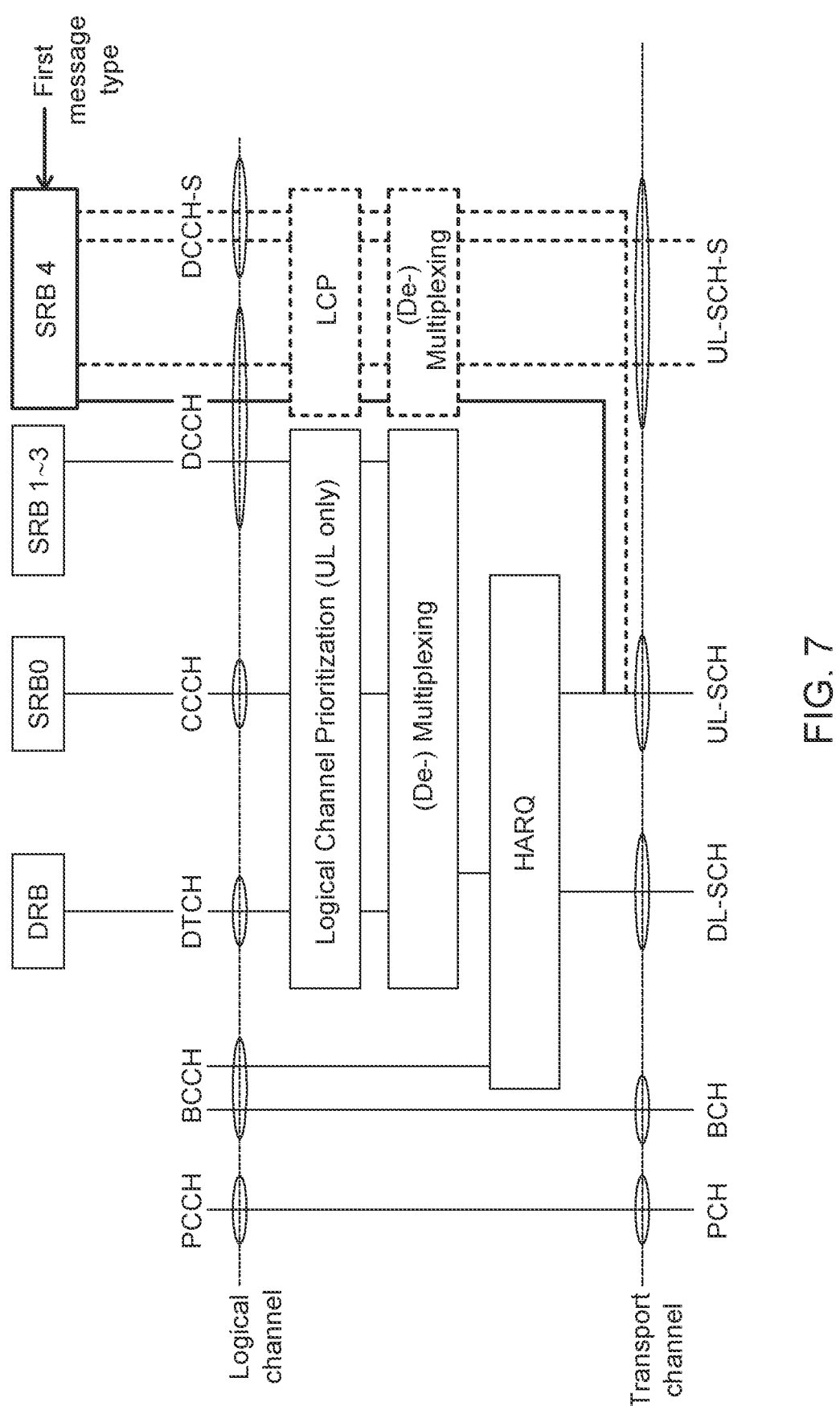
FIG. 7 is a schematic diagram of a MAC structure for a communication method on the CP for uplink (UL) communications, according to a possible implementation.
Figure 8:
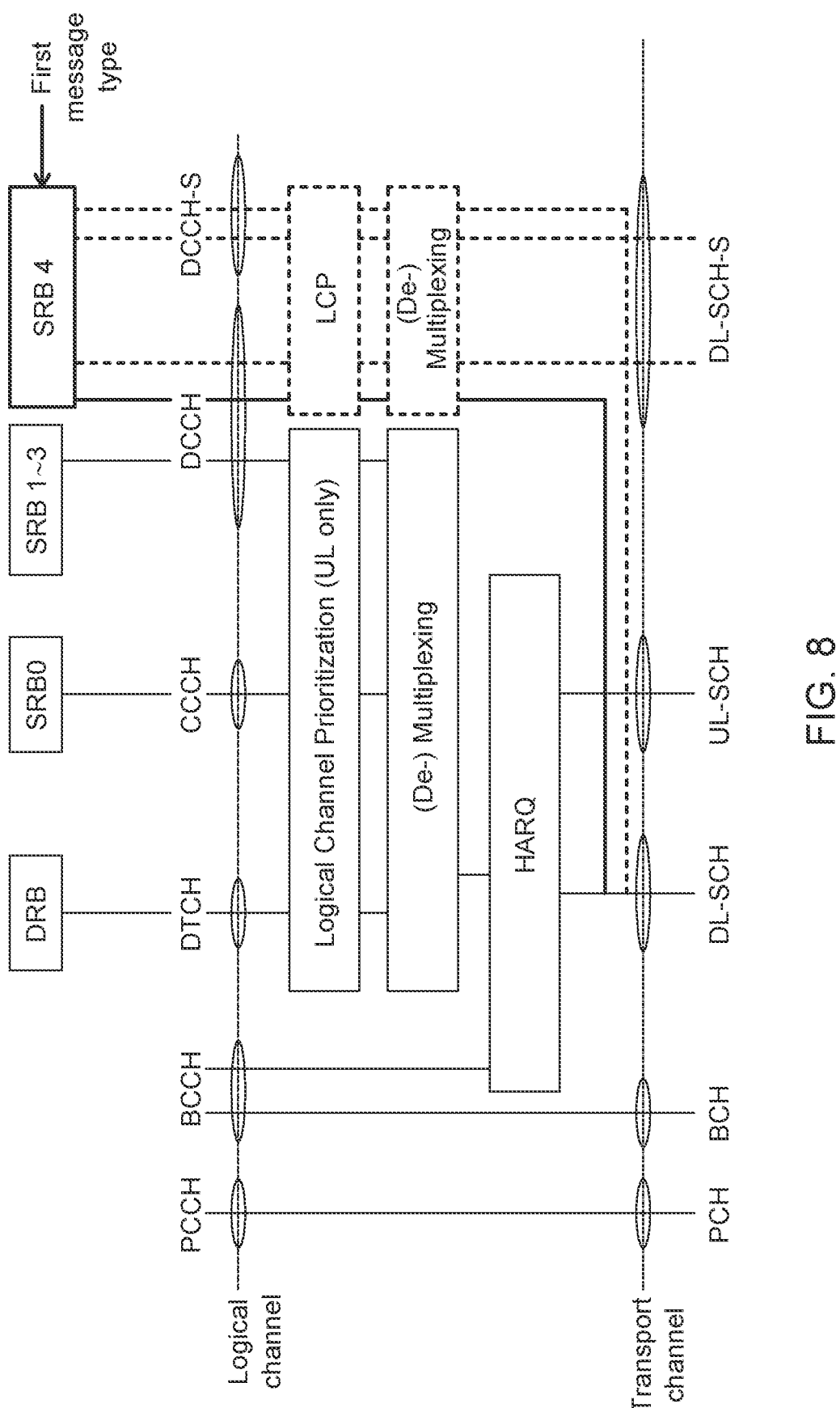
FIG. 8 is a schematic diagram of a MAC structure for a communication method on the CP for downlink (DL) communications, according to a possible implementation.

Referring to FIGS. 7 and 8, a possible structure for the communication of a first message over the Control Plane (CP) of a RAN is provided. In this exemplary implementation, the structure is a Medium Access Control (MAC) structure part of the MAC layer. FIG. 7 illustrates a possible implementation for uplink communications (UL) and FIG. 8 illustrates a possible implementation for downlink (DL) communications.

Uplink or Downlink Communications of a First Message on the Control Plane (CP)

Referring to FIG. 7, wherein UL communications are conducted in the CP, a dedicated SRB is used to provide for the communication of a first message which is associated with the first message type. In this exemplary implementation, the dedicated SRB is referred to as SRB4. This dedicated SRB is used to communicate control signaling comprised in the first message, where the control signaling has a transmission priority that is lower than other higher priority control signaling, associated with higher priority message types, and which are mapped to other SRBs, such as SRB0~3. In other words, the priority of the first SRB is lower than a priority of any one of SRB0 to SRB3, and the Logical Channels (LCs) of SRB4 carry low priority control signaling. The priority of the LCs of SRB4 thus have a lower priority than that of the LCs of SRB 0~3. The priority for the LCs of SRB4 can be predefined or configured by the network (NW).

SRB0~3 are standardized in 3GPP NR, wherein SRB0 carries RRC messages using the CCCH logical channel; SRB1 carries RRC messages, which may include a piggybacked Non-Access Stratum (NAS) message, as well as NAS messages prior to the establishment of SRB2, all using DCCH logical channel; SRB2 carries NAS messages, all using the DCCH logical channel; and SRB3 is for specific RRC messages when UE is in EN-DC, all using DCCH logical channel.

According to a possible implementation, to reduce the air interface overhead, Hybrid Automatic Repeat Request (HARQ) retransmission for the messages of the first message type does not need to be enabled. As for Automatic Repeat Request (ARQ) performed at the Radio Link Layer (RLC) layer, this error-control method can also be flexibly configured by the NW, according to yet another possible implementation. For example, the NW may configure the Acknowledged Mode (AM) mode to an RLC entity to enable ARQ, or alternatively, the NW may configure the Unacknowledged Mode (UM) or the Transparent Mode (TM) mode to an RLC entity to disable ARQ. As shown in FIGS. 7 and 8, no HARQ retransmission is performed for LCs carried on the dedicated SRB, i.e. SRB4, while HARQ retransmission is performed for LCs on SRB0~3.

According to a possible implementation, multiplexing of the LCs transporting message of the first message type can be performed separately from the multiplexing of the LCs carrying messages of higher priority message types. As can be appreciated, given that no HARQ retransmission is performed on LCs carrying messages of the first message type and that HARQ is performed on the LCs carrying messages of higher priority message types, the low priority LCs cannot be multiplexed with higher priority LCs. Otherwise the HARQ error correction and error-control operations will be jeopardized. For example, if the LCs of a transport channel are multiplexed, e.g. a MAC PDU for the Uplink Shared Channel (UL-SCH), and considering that LCs on SRB0~3/DRB are subject to HARQ retransmission but that LCs on SRB4 are not, if the NW multiplexes a LC on SRB0~3/DRB and a LC on SRB4 into one transport channel, then the HARQ operation cannot be valid, since a given LC may require retransmission but another LC may not. Consequently, separate LC multiplexing must be conducted, i.e. the NW and the UE can multiplex the LCs on SRB0~3 (or on DRB, as will be explained for UP communications) into one transport channel, and can multiplex LCs on SRB4 into one transport channel, but a LC on SRB0~3 (or DRB) and a LC on SRB4 cannot be multiplexed into one transport channel, as illustrated in FIG. 7 and FIG. 8.

According to another implementation, separate Logical Channel Prioritization (LCP) can be performed for the first SRB carrying the first message (e.g. SRB4) and for the other SRB carrying higher priority message types (e.g. SRB0~3). It should be noted that LCP and (de-)multiplexing are optional processes and do not necessarily need to be performed.

Still referring to FIGS. 7 and 8, at the Logical Channel level, the LCs on SRB4 can be Dedicated Control Channel (DCCH) or specific LCs, e.g. DCCH-specific (DCCH-S). For example, a specific LC can be a LC that is dedicated for the transmission of the first type of messages. As for the Transport Channel level for SRB4, the channel used can be an uplink shared channel (UL-SCH on FIG. 7) or a downlink shared channel (DL-SCH on FIG. 8), or a specific transport channel, e.g. UL-SCH-Specific (UL-SCH-S on FIG. 7) or DL-SCH-Specific (DL-SCH-S on FIG. 8).

For example, with reference to FIG. 7, a UL message of the first message type carrying low priority control signaling can be communicated on a first signaling radio bearer SRB4; the Radio Link Control Service Access Point (RLC-SAP) can be one of Acknowledge Mode (AM), Unacknowledged Mode (UM) or Transparent Mode (TM); the LC can be one of DCCH or DCCH-S, and the direction of the message is from the User Equipment to the Network, as summarized below:

Signalling radio bearer: SRB4
RLC-SAP: AM/UM/TM
Logical channel: DCCH or DCCH-S
Direction: UE to Network As another example, with reference to FIG. 8, a DL message of the first message type carrying low priority signaling can be communicated on a signaling radio bearer SRB4; the Radio Link Control Service Access Point (RLC-SAP) can be one of Acknowledge Mode (AM), Unacknowledged Mode (UM) or Transparent Mode (TM); the LC can be one of DCCH or DCCH-S; and the direction of the message is from the Network to the User Equipment, as summarized below:

Signalling radio bearer: SRB4
RLC-SAP: AM/UM/TM
Logical channel: DCCH or DCCH-S
Direction: Network to UE Uplink or Downlink Communications of a First Message on the User Plane (UP)

Figure 9:
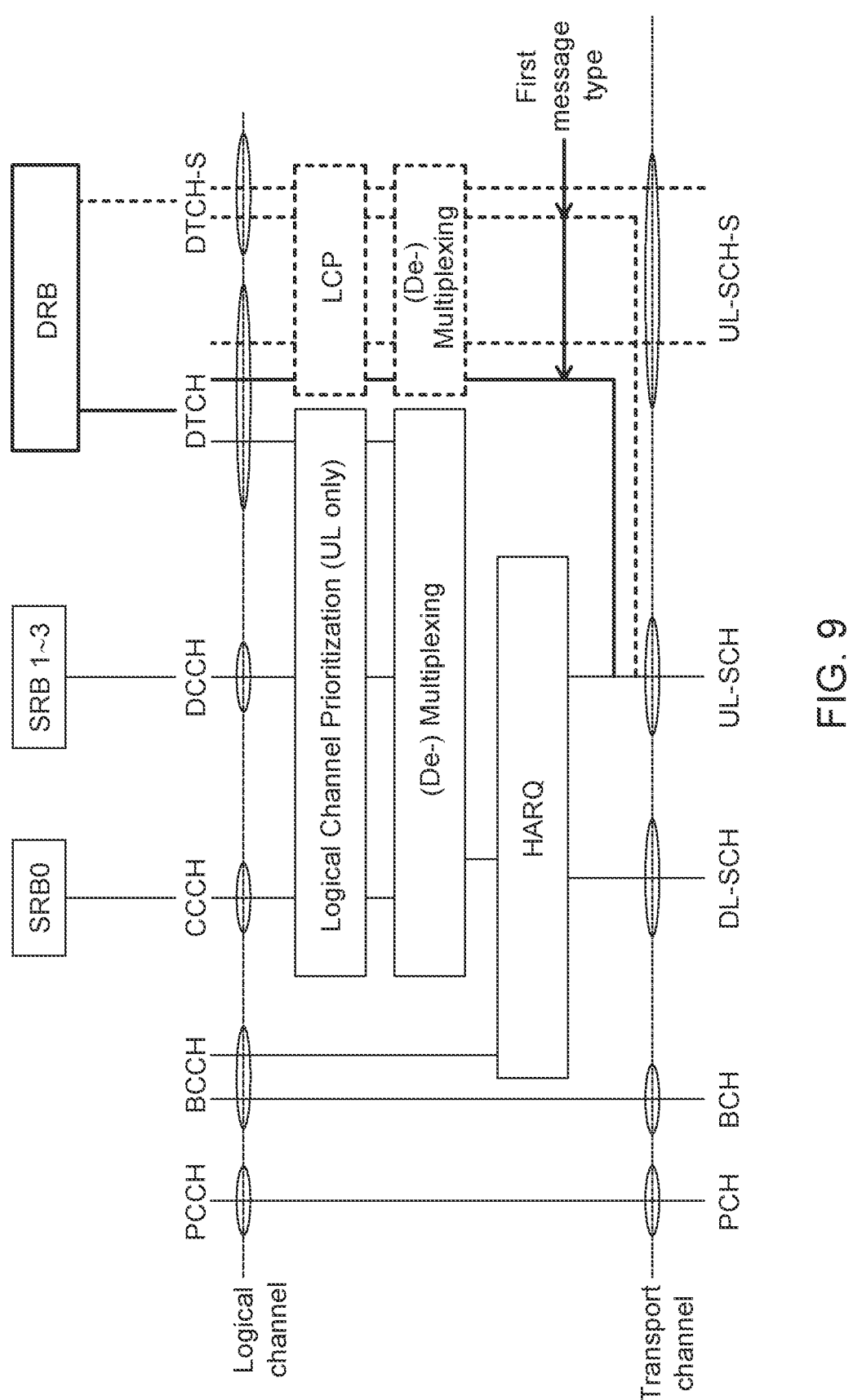
FIG. 9 is a schematic diagram of a MAC structure for a communication method on the UP for uplink (UL) communications, according to a possible implementation.
Figure 10:
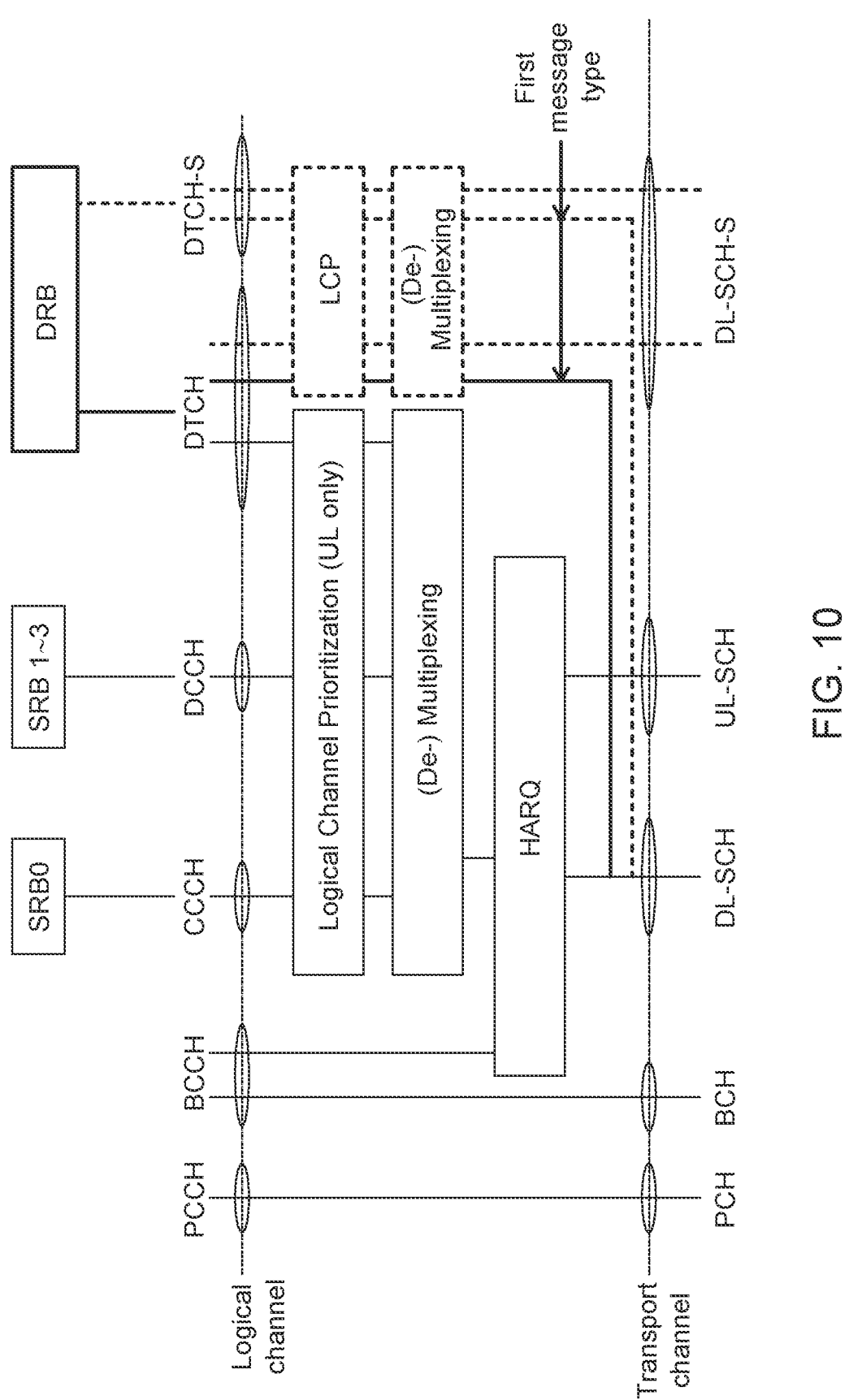
FIG. 10 is a schematic diagram of a MAC structure for a communication method on the UP for downlink (UL) communications, according to a possible implementation.

Referring now to FIGS. 9 and 10, the MAC structure and the communication method for UL and DL messages of the first message type, when carrying data in the User Plane, will be explained, according to a possible implementation. In FIG. 9, wherein UL communications are conducted in the UP, the Data Radio Bearer (DRB) is used to provide for the communication of the first message which is associated with the first message type. In this case, the DRB used for carrying the first message is the same that is used for a second message associated with a regular or traditional service (such as a second message type). A (new) DRB flow defined in FIG. 9 or 10 with LCP and (de)multiplexing parameters may indicate a specific QoS forwarding behavior and treatment for the first message type having ultra-low priority requirements. The LCP and (de)multiplexing are optional processes and therefore the LCP and (de)multiplexing parameters may also be optional. The priority requirements can include one or multiple of packet loss rate, packet delay budget, scheduling weights, admission thresholds, queue management thresholds, link layer protocol configuration, e.g. high packet loss rate, high packet delay budget, small scheduling weights. In other words, messages of the first message type can be communicated with the lowest priority, corresponding to a best effort transmission or delivery.

The higher priority data can correspond to data associated with QFI defined as per the 5G 3GPP, such as conversational voice, live streaming video, real-time gaming, or IMS signaling, as examples only. Contrary to messages having higher priority message types, messages of the first message type are not sensitive to packet loss and/or delay since the loss of a packet has limited impacts on the overall communication of the local traffic data. For example, Artificial Intelligence (AI) models can be successfully trained even some sensing/AI data packets communicated by a communication device are lost.

According to a possible implementation, to reduce the air interface overhead, Hybrid Automatic Repeat Request (HARQ) retransmission for messages carrying this type of data does not need to be enabled. As for Automatic Repeat Request (ARQ) performed at the Radio Link Layer (RLC) layer, this error-control method can also be flexibly configured by the NW, according to yet another possible implementation. For example, the NW may configure the Acknowledged Mode (AM) mode to an RLC entity to enable ARQ, or alternatively, the NW may configure the Unacknowledged Mode (UM) or the Transparent Mode (TM) mode to an RLC entity to disable ARQ. As shown in FIGS. 9 and 10, no HARQ retransmission is performed for LCs carried on the DRB.

Based on the DRB flow configuration associated with the messages or packets of the first type, the Network or the communication device (UE) can map the QoS flow to a DRB with low logical channel priorities. Similar to control signaling being transported on the Control Plane, HARQ retransmission is not performed for LCs carrying the low priority data contained in messages of the first type on the User Plane. In addition, just as for the CP communications, separate LCP and (De-)multiplexing is performed for LCs carrying data of the first message type and for LCs carrying data associated with higher priority message types.

Still referring to FIGS. 9 and 10, at the Logical Channel level, the LCs on DRB can be Dedicated Traffic Channel (DTCH) or specific LCs, e.g. DTCH-specific (DTCH-S). As for the Transport Channel level for DRB, the channel used can be an uplink shared channel (UL-SCH on FIG. 9) or a downlink shared channel (DL-SCH on FIG. 10), or a specific transport channel, e.g. UL-SCH-Specific (UL-SCH-S on FIG. 9) or DL-SCH-Specific (DL-SCH-S on FIG. 10).

For example, with reference to FIG. 9, a UL message of the first message type carrying low priority data can be communicated on a data radio bearer DRB. The Radio Link Control Service Access Point (RLC-SAP) can be one of Acknowledge Mode (AM), Unacknowledged Mode (UM) or Transparent Mode (TM). The LC can be one of DTCH or DTCH-S, and the direction of the message is from the User Equipment to the Network, as summarized below:

Radio Bearer: DRB
    RLC-SAP: AM/UM/TM
    Logical channel: DTCH or DTCH-S
    Direction: UE to Network As another example, with reference to FIG. 10, a DL message of the first message type carrying low priority data can be communicated on a data radio bearer DRB, the Radio Link Control Service Access Point (RLC-SAP) can be one of Acknowledge Mode (AM), Unacknowledged Mode (UM) or Transparent Mode (TM), the LC can be one of DTCH or DTCH-S, and the direction of the message is from the Network to the User Equipment, as summarized below:

Radio Bearer: DRB
    RLC-SAP: AM/UM/TM
    Logical channel: DTCH or DTCH-S
    Direction: Network to UE As can be appreciated, the proposed method and structure enable QoS handling for messages carrying local traffic (either signaling or data) according to a ultra-low priority or best effort service, while still enabling higher transmission priority for messages associated with existing regular service(s). Given that messages of the first type are transmitted according to an ultra-low or best effort service, HARQ retransmission may not be implemented for this new service, which advantageously reduces air interface overhead.

Logical Channel Configuration for the First Message Type

According to possible implementations, the LC for communicating of the first message is part of a first group of LCs on which no HARQ is performed; while the LC for communicating higher priority message (e.g. a second message) is part of a second group of LCs on which HARQ is performed. The logical channel configuration can be made as follows:

HARQ-Allowed: True or False.

A parameter indicating whether HARQ retransmission must be performed can be provided. For example, the NW can configure this parameter, referred to as HARQ-Allowed, to False (or 0) for LCs of the first group and True (or 1) for LCs of the second group (i.e. LCs associated with traditional or higher priority services.)

Priority: integer

A parameter indicating the priority level of the messages being communicated can be provided. For example, the priority parameter can take a plurality of integer values (such as INTEGER 1 to 16, as an example only), wherein a smaller value corresponds to a higher priority. For LCs of the first group, carrying messages associated with the first message type (i.e. without HARQ), the priority parameter can be set with higher values of the range. In a possible implementation, a subset of the available priority values can be reserved for LCs of the first group, while another subset of the available priority values can be reserved for higher priority LCs. In a possible implementation, a priority value allocated to LCs of the first group (without HARQ) can be greater than a priority value allocated to higher priority LCs, since a higher value corresponds to a lower priority. For example, INTEGER (15,16) can be attributed to LCs of the first group, while the remaining values (1 to 14) are attributed to the higher priority services. The subsets can be predefined or configured by the NW.

PrioritizedBitRate (PBR)

A parameter indicating the Prioritized Bit Rate of the messages being communicated can be provided. For example, this parameter can have an ENUMERATED type, where the different values of the list correspond to different bit rates, such as {kBps0, kBps8, kBps16, kBps32, kBps64, kBps128, kBps256, kBps512, kBps1024, kBps2048, kBps4096, kBps8192, kBps16384, kBps32768, kBps65536, infinity}. When HARQ retransmission is not allowed, i.e. when the HARQ-allowed parameter is set to False, a subset of values for the PBR parameter can be configured, with kBps0 or kBps8, as examples only. The PBR parameter is used when performing the LCP process. The subsets for PBR can be predefined or configured by the NW.

BucketSizeDuration (BSD)

A parameter indicating the Bucket Size Duration of the messages or packets being communicated can be provided. For example, this parameter can have an ENUMERATED type, where the different values of the list correspond to different durations, such as {ms5, ms10, ms20, ms50, ms100, ms150, ms300, ms500, ms1000}. When HARQ retransmission is not allowed, i.e. when the HARQ-allowed parameter is set to False, a subset of values for the BSD parameter can be configured, with ms5 or ms10, as examples only. The BSD parameter is used when performing the LCP process. The subsets for BSD can be predefined or configured by the NW.

Scheduling Request (SR) ID: SR configuration applicable to first group LC.

In a possible implementation, a dedicated SR resource (e.g. SR periodicity and offset, PUCCH resources) can be linked to the LC of the first group, associated with the first message type. The NW can derive the SR for the new service implicitly and can allocate resources accordingly. Therefore, the NW can configure orthogonal SR resources for the first message type (for which there is no HARQ retransmission) and for other higher priority/regular services (for which HARQ is performed). An uplink SR resource can therefore be dedicated for the first message type.

Logical Channel Prioritization (LCP) for the First Message Type

Logical Channel Prioritization (LCP) is a process which is typically conducted whenever a new transmission is performed. According to a possible implementation, the LCP process for LCs carrying low priority message (e.g. first message) associated with a first message type priority is performed separately, or distinctly, from the LCP process performed on the higher priority messages associated with higher priority/traditional message types or services. The LCP process preferably begins only after all the LCs carrying the higher priority messages have been transmitted. In other words, LCs of the second group (carrying higher priority messages) are transmitted with a higher priority order than LCs of the first group (carrying low priority messages.)

According to a possible implementation, a first step (step 1) of the LCP process consists in the Logical Channel Grouping. The LCs are grouped into two or more groups, where N is the number of groups, and N>=2. The LCs carrying higher priority messages, on which HARQ retransmission is performed, can be attributed to one or more groups. The LCs carrying the low priority messages, i.e. LCs on which no HARQ retransmission is conducted, are attributed to one or more groups. For example, if there are two groups, where N=2, the LC carrying a first message on which no HARQ is to be performed will belong to a first group, or group-1, while the LCs carrying a second message with HARQ retransmission, will belong to a second group, or group-2. Of course, other implementations are possible, where N is greater than 2 for the LCs carrying low priority messages and in such a case, the LCs would be allocated to different priority groups.

Logical Channel Grouping

According to a possible implementation, the second step (step 2) consists in the prioritization of the LCs (LCP) for the N groups of LCs carrying higher priority data, so as to transmit the LCs carrying higher priority data first. In this second step, the LCP process within a group corresponds to Section 5.4.3.1 in TS 38.321 (Medium Access Control (MAC) protocol specification) of the 3GPP NR protocol.

LCP for groups of LCs carrying higher priority data—with HARQ

According to a possible implementation, the second step comprises three sub steps. In a first sub step (step 2-1), the following UE variable is used for the Logical channel prioritization procedure:

Bj which is maintained for each Logical Channel j.

The MAC entity initializes Bj of the LC to zero when the LC is first established. Then, for each logical channel j, the MAC entity 1> increments Bj by the product PBR×T before every instance of the LCP procedure, where T is the time elapsed since Bj was last incremented; and 1> if the value of Bj is greater than the bucket size (i.e. PBR×BSD):

2> set Bj to the bucket size.

According to a possible implementation, a second sub step consists in selecting candidate LCs (i.e. candidate logical channel selection). The MAC entity selects the logical channels that satisfy a given set of conditions, wherein the conditions are different depending on the different service requirements. For example, for a given service or message type, latency requirement and/or throughput can be set to predefined values, and these values may differ from one message type to the other, hence different conditions must be met for different services or message types.

For example, for UL transmissions, a communication device 1> selects the LCs for each UL grant that satisfies the following conditions:

2> the set of allowed Subcarrier Spacing index values in allowedSCS-List, if configured, includes the Subcarrier Spacing index associated to the UL grant; and 2> maxPUSCH-Duration, if configured, is larger than or equal to the PUSCH transmission duration associated to the UL grant; and 2> configuredGrantType 1 Allowed, if configured, is set to true in case the UL grant is a Configured Grant Type 1; and 2> allowedServingCells, if configured, includes the Cell information associated to the UL grant. Does not apply to logical channels associated with a DRB configured with PDCP duplication within the same MAC entity (i.e. CA duplication) for which PDCP duplication is deactivated.

According to a possible implementation, a third sub step consist in allocating resources, where the resources are allocated in a decreasing priority order. Details can be found in Section 5.4.3.1 in TS 38.321.

LCP for LCs of the First Group

Once all data in the groups comprising LCs carrying higher priority messages (which are HARQ-enabled) are transmitted, the MAC entity performs the LCP process for the one or more group(s) with LCs carrying messages of the first type on which HARQ is not enabled. The MAC entity performs the sub-steps described above with regard to HARQ-enabled LCs, including the selection of LCs and the allocation of resources.

As can be appreciated, the proposed method is advantageous as it provides a dedicated LC configuration for the first message type and a separate LCP, enabling the QoS handling for messages associated with this new message type.

Sidelink (SL) Communications of a First Message

Figure 11:
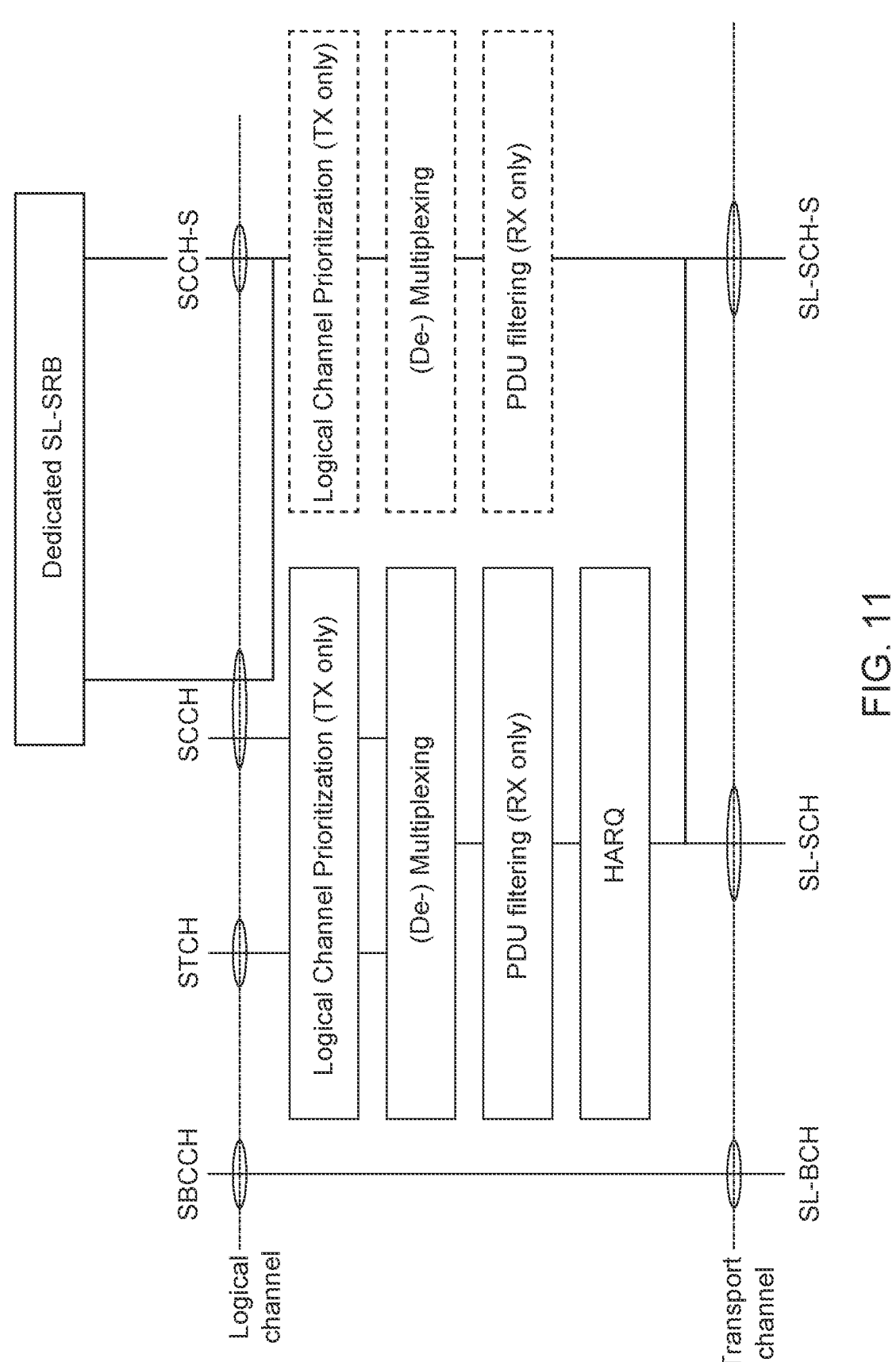
FIG. 11 is a schematic diagram of a MAC structure for a communication method on the CP for sidelink (SL) communications, according to a possible implementation.
Figure 12:
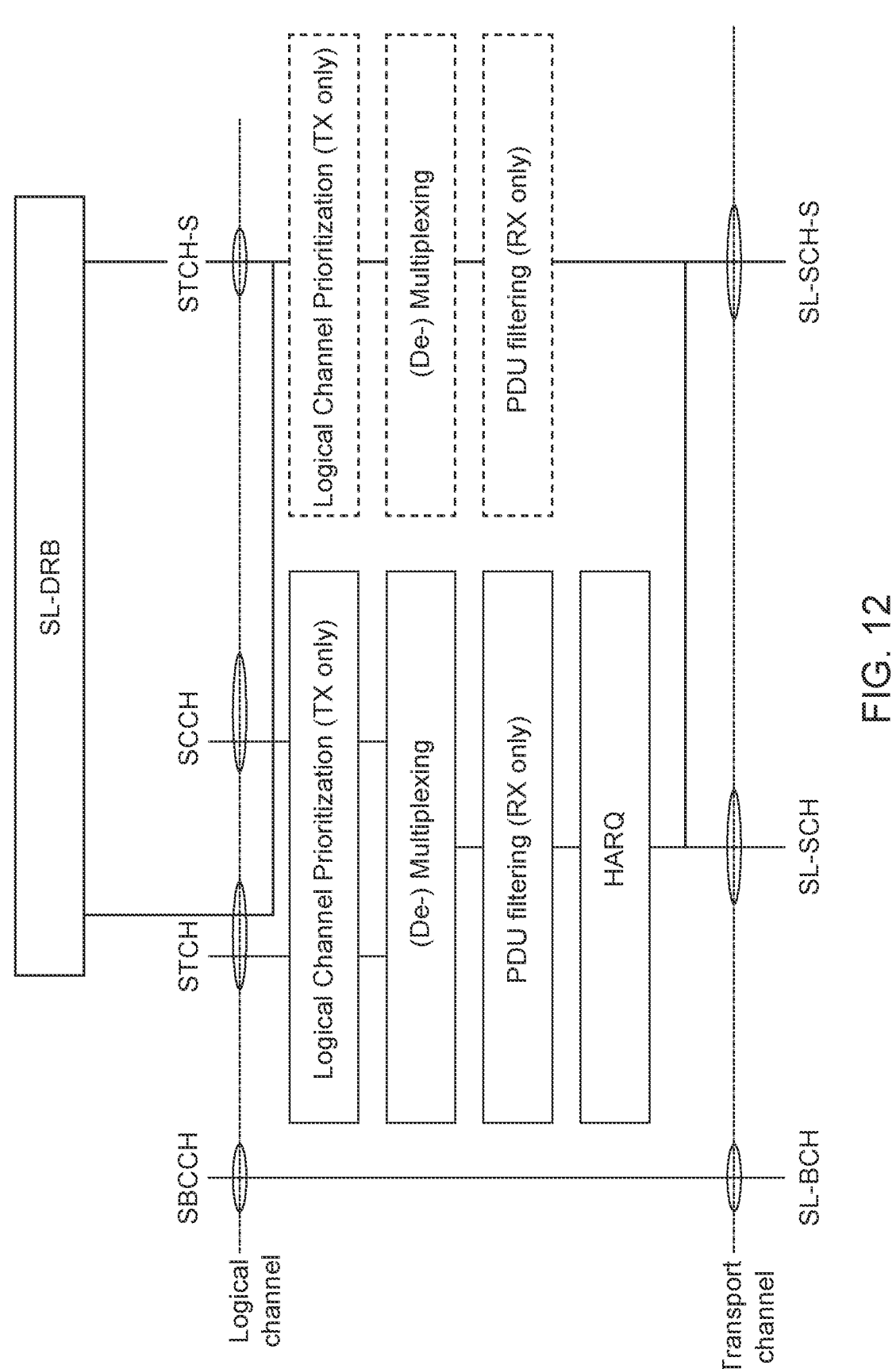
FIG. 12 is a schematic diagram of a MAC structure for a communication method on the UP for sidelink (SL) communications, according to a possible implementation.

Referring now to FIGS. 11 and 12, the MAC structure and the communication method for SL messages in the UP and in the CP will be explained, according to possible implementations.

Sidelink Communication of a First Message on the Control Plane (CP)

Referring to FIG. 11, wherein SL communications are conducted in the CP, a dedicated SL-SRB is used to provide for the communication of a first message which is associated with the first message type. In this exemplary implementation, the dedicated SL-SRB is referred to as SL-SRB4. This dedicated SL-SRB is used to communicate the first message having a transmission priority that is lower than other higher priority messages, which are mapped to other SL-SRBs, such as SL-SRB0~3. In other words, the Logical Channels (LCs) of SL-SRB4 carry low priority messages, such as local control signaling traffic. The priority of the LCs of SL-SRB4 thus have a lower priority than the LCs of SL-SRB 0-3. The priority for the LCs of SL-SRB4 can be predefined or configured by the NW.

According to a possible implementation, to reduce the air interface overhead, Hybrid Automatic Repeat Request (HARQ) retransmission for the first message does not need to be enabled. As for Automatic Repeat Request (ARQ) performed at the Radio Link Layer (RLC) layer, this error-control method can also be flexibly configured by the NW, according to yet another possible implementation. For example, the NW may configure the Acknowledged Mode (AM) mode to an RLC entity to enable ARQ, or alternatively, the NW may configure the Unacknowledged Mode (UM) or the Transparent Mode (TM) mode to an RLC entity to disable ARQ. As shown in FIGS. 11 and 12, no HARQ retransmission is performed for LCs carried on the dedicated SL-SRB, i.e. SL-SRB4, while HARQ retransmission is performed for LCs on SL-SRB0~3.

According to a possible implementation, multiplexing of the LCs transporting message of the first message type is performed separately from the multiplexing of the LCs carrying higher priority messages. As can be appreciated, given that no HARQ retransmission is performed on LCs carrying the first messages (or low priority messages) and that HARQ is performed on the LCs carrying higher priority messages, the low priority LCs cannot be multiplexed with the LCs carrying higher priority messages. Otherwise the HARQ error correction and error-control operations will be jeopardized. For example, if the LCs of a transport channel are multiplexed, e.g. a MAC PDU for the Sidelink Shared Channel (SL-SCH), and considering that LCs on SL-SRB0~3/SL-DRB are subject to HARQ retransmission but that LCs on SL-SRB4 are not, if the NW multiplexes a LC on SL-SRB0~3 (or SL-DRB for UP communications) and a LC on SL-SRB4 into one transport channel, then the HARQ operation cannot be valid, since a given LC may require retransmission but another LC may not. Consequently, separate LC multiplexing must be conducted, i.e. the NW and the UE can multiplex the LCs on SL-SRB0~3 (or on SL-DRB, as will be explained for UP communications) into one transport channel, and can multiplex LCs on SL-SRB4 into one transport channel, but a LC on SL-SRB0~3 (or SL-DRB) and a LC on SL-SRB4 cannot be multiplexed into one transport channel, as shown in FIG. 11 and FIG. 12.

According to another implementation, separate Logical Channel Prioritization (LCP) can be performed for the Radio Bearer associated with the first message type (SL-SRB4) and the other higher priority message types (SL-SRB0~or SL-DRB). It should be noted that LCP and (De-)Multiplexing are optional and do not necessarily need to be performed.

Still referring to FIG. 11, at the Logical Channel level, the LCs on SL-SRB4 can be Sidelink Control Channel (SCCH) or specific LCs, e.g. SCCH-specific (SCCH-S). As for the Transport Channel level for SL-SRB4, the channel used can be a Sidelink Shared Channel (SL-SCH), or a specific transport channel, e.g. SL-SCH-Specific (SL-SCH-S).

For example, with reference to FIG. 11, a SL message of the first message type carrying low priority control signaling can be communicated on a dedicated signaling radio bearer SL-SRB4, the Radio Link Control Service Access Point (RLC-SAP) can be one of Acknowledge Mode (AM), Unacknowledged Mode (UM) or Transparent Mode (TM), the LC can be one of SCCH or SCCH-S, and the direction of the message is from the User Equipment to another User Equipment, as summarized below:

Signalling radio bearer: SL-SRB4
RLC-SAP: AM/UM/TM
Logical channel: SCCH or SCCH-S
Direction: UE to UE Sidelink Communications of a First Message on the User Plane (UP)

Referring now to FIG. 12, the MAC structure and the communication method for SL messages in the User Plane will be explained, according to a possible implementation. In FIG. 12, wherein SL communications are conducted in the UP, a Sidelink Data Radio Bearer (SL-DRB) is used to provide for the communication of messages associated with the first message type. In this case, the SL-DRB used for carrying messages of the first message type is the same that is used for messages associated with regular or traditional services. A (new) DRB flow defined in FIG. 12 with LCP and (de)multiplexing parameters may indicate a reference to a specific QoS forwarding behavior and treatment for the messages having ultra-low priority requirements. The LCP and (de)multiplexing are optional processes and therefore the LCP and (de)multiplexing parameters may also be optional. The priority requirements can include one or multiple of packet loss rate, packet delay budget, scheduling weights, admission thresholds, queue management thresholds, link layer protocol configuration, e.g. high packet loss rate, high packet delay budget, small scheduling weights. In other words, messages of the first type can be communicated with the lowest priority, corresponding to a best effort transmission or delivery.

Based on the DRB flow configuration associated with the low priority messages (e.g. first message), the transmitting (TX) UE can map the QoS flow to a SL-DRB with low logical channel priorities. Similar to the messages being transported on the Control Plane, HARQ retransmission is not performed for LCs carrying low priority messages (e.g. first message) on the User Plane. In addition, just as for the CP communications, separate LCP and (De-)multiplexing is performed for LCs carrying messages of the first type and for LCs carrying messages associated with higher priority/traditional service.

Still referring to FIG. 12, at the Logical Channel level, the LCs on SL-DRB can be Shared Traffic Channel (STCH) or specific LCs, e.g. STCH-specific (STCH-S). As for the Transport Channel level for SL-DRB, the channel used can be a sidelink shared channel (SL-SCH) or a specific transport channel, e.g. SL-SCH-Specific (SL-SCH-S).

For example, with reference to FIG. 12, a SL message carrying the first message can be communicated on a sidelink data radio bearer SL-DRB. The Radio Link Control Service Access Point (RLC-SAP) can be one of Acknowledge Mode (AM), Unacknowledged Mode (UM) or Transparent Mode (TM). The LC can be one of STCH or STCH-S, and the direction of the message is from the User Equipment to another User Equipment, as summarized below:

Radio Bearer: SL-DRB
RLC-SAP: AM/UM/TMn
Logical channel: STCH or STCH-S
Direction: UE to UE Advantageously, according to the proposed communication method, the QoS handling for messages associated with the first message type is also enabled for sidelink communications.

With reference to FIGS. 13A to 13C, possible steps of the methods described above are schematically illustrated in flow diagrams.

Referring to FIG. 13A, a first communication device, such as any one of devices 110, 170 or 172 from FIGS. 3 to 6, can generate a first message only within a radio access network (RAN) of a wireless communication network. The communication device can communicate the first message in a radio bearer (RB) for transmission to a second communication device within the RAN. The first message can be associated with a first message type, where a priority of the first message type is lower than a priority of a second message having second message type, which is communicated via the core network (CN) of the wireless communication network, as per block 1010 of the flow diagram. In possible embodiments, the first message comprises one of control signaling or data.

For DL communications, the first communication device may be for example a BS (such as devices 170 or 172) while the second communication device is an ED (or UE) 110. In other embodiments, such as for UL communications, the first communication device may be an ED (or UE) while the second communication device may be a BS. For sidelink communications, both the first and second communication devices can be implemented as EDs (or UEs.)

Optionally, Logical Channel Prioritization (LCP) can be performed by the communication device (step 1012). Still optionally, Logical Channels (LCs) carrying low priority messages (such as a first message having a first message type) can be multiplexed separately from LCs carrying higher priority messages (such as a second message having a second message type), as per step 1014. Still optionally, LCs carrying low priority messages can be added to MAC PDUs on which no HARQ retransmission performed, as per step 1016.

Referring to FIG. 13B, the optional step of LCP is summarized. LCP can comprise a first step 1020 of creating at least two groups, where a first group comprises LCs carrying low priority messages (or messages having a first message type) and where a second group comprises LCs carrying higher priority messages (such as messages having a second message type). The LCs carrying the messages of higher priority as assigned to the second group (step 1022) and transmitted, by decreasing priority order, as per the steps illustrated in FIG. 10C. The LCs carrying the messages of lower priority as assigned to the first group (step 1023) and transmitted, by decreasing priority order, as per the steps illustrated in FIG. 10C.

Referring to FIG. 13C, the allocation of LCs in the second group comprises maintaining Bj for each LCj, where Bj represents the current bucket contents for LCj. The MAC entity then increments Bj by the product BPR×T (time elapsed since last increment) and sets Bj to the bucket size (step 1030). The LCs channels are then selected (step 1032), based on service requirements associated to the LCs (e.g. to meet latency or throughput conditions for a given service). After all data in the groups where the LCs are configured with the HARQ parameter set to allowed (i.e. after all LCs carrying higher priority messages have been sent), LCP and LC transmission for LC groups having the HARQ parameter set to false or not allowed is performed. As can be appreciated, a specific LC configuration for messages of the first group and separate LCP for LCs carrying messages of the first type ensure proper handling of messages of the first type.

The examples described with reference to the different implementations and embodiments disclosed in this specification can be implemented by electronic hardware or a combination of computer software and electronic hardware. Whether the functions are performed by hardware or software depends on applications and design constraints of the technical solutions. A person skilled in the art may use different methods to implement the described functions for each application.

In the several embodiments provided in this application, it should be understood that the disclosed system, devices, and method may be implemented in other manners. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

All or some of the implementations and embodiments of the present invention can be implemented by means of software, hardware, firmware, or any combination thereof. When software is used to implement a given implementation, it can be implemented completely or partially in a form of a computer program product. The computer program product includes one or more computer instructions. When the computer program instructions are loaded and executed on the computer, the steps or functions according to the implementations of the present disclosure are all or partially generated. The computer may be a general-purpose computer, a dedicated computer, a computer network, or other programmable apparatuses. The computer instruction may be stored in a computer readable storage medium or may be transmitted by using the computer readable storage medium.

As can be appreciated from the above description and from the exemplary implementations provided, data delivery and QoS handling for message of the first type, such as local control signaling and data, is enabled by the proposed method, communication devices and structure. According to a first alternative, for communications over the UP, QoS handling can be advantageously reused in the SDAP layer. For communications over the CP, a new QoS handling is added.

As for the HARQ retransmission process and the LCP at the MAC layer, the method, communication device and structure propose not to perform HARQ on LCs carrying messages of the first message type, while ARQ may be performed in RLC. In addition, the LCP process is performed separately (or independently) for the messages having higher priority transmission requirements and for messages having ultra-low or best effort transmission requirements, as per the first message type. Finally, LC can be associated with dedicated Signalling Request (SR) configurations for the first message type.

Several alternative implementations and examples have been described and illustrated herein. The implementations of the disclosure described above are intended to be exemplary only. A person skilled in the art would appreciate the features of the individual implementations, and the possible combinations and variations of the components. A person skilled in the art would further appreciate that any of the implementations could be provided in any combination with the other implementations disclosed herein. It is understood that the disclosure may be embodied in other specific forms without departing from the central characteristics thereof. The present examples and implementations, therefore, are to be considered in all respects as illustrative and not restrictive, and the disclosure is not to be limited to the details given herein. Accordingly, while specific implementations have been illustrated and described, numerous modifications come to mind without significantly departing from the scope of the disclosure as defined in the appended claims.

The invention claimed is:

1. A method in a wireless communication network, the method comprising:
   generating a first message in a first communication device only within a radio access network (RAN) of the wireless communication network; and
   communicating, by the first communication device, the first message in a radio bearer (RB) with a second communication device within the RAN, wherein the first message is communicated without performing hybrid automatic repeat request (HARQ),
   the first message being associated with a first message type, a priority of the first message type being lower than a priority of a second message having a second message type communicated via a core network (CN) of the wireless communication network, and wherein the first message is any one of control signaling or data.

2. The method of claim 1, wherein the first message is the control signaling, the first message is transmitted in a first signaling radio bearer (SRB), and the first SRB is one of a dedicated SRB or a group common SRB.

3. The method of claim 2, wherein a priority of the first SRB is lower than a priority of any one of SRB0 to SRB3.

4. The method of claim 2, wherein a priority of logical channels (LCs) in the first SRB is lower than a priority of LCs in any one of SRB0 to SRB3.

5. The method of claim 1, wherein the first message is the data, the first message is transmitted in a first data radio bearer (DRB), and wherein the first DRB is one of a dedicated DRB or a group common DRB.

6. The method of claim 1, further comprising:
multiplexing, by the first communication device, the first message on the RB into a first transport channel, the first transport channel comprises any one of:
an uplink shared channel (UL-SCH);
a downlink shared channel (DL-SCH);
a specific uplink shared channel (UL-SCH-S);
a specific downlink shared channel (DL-SCH-S);
a sidelink shared channel (SL-SCH); or
a specific sidelink shared channel (SL-SCH-S).

7. The method of claim 1, further comprising:
communicating, by the first communication device, an uplink scheduling request (SR) with the second communication device, wherein an uplink SR resource is dedicated for the first message type.

8. The method of claim 1, wherein:
an LC for communicating the first message is part of a first group of LCs on which no HARQ is performed; and
the LC for communicating the second message is part of a second group of LCs on which HARQ is performed.

9. The method of claim 8, wherein the LCs of the second group are transmitted with a higher priority order than LCs of the first group.

10. The method of claim 9, further comprising:
multiplexing the LCs of the first group in MAC PDU(s) without performing HARQ; and
multiplexing the LCs of the second group in MAC PDU(s) and performing HARQ on the MAC PDU(s), wherein the multiplexing the LCs of the first group and the multiplexing the LCs of the second group are performed separately.

11. The method of claim 1, wherein:
the first message type is associated with a first type of quality of service (QoS),
transmission requirements of the first type of QoS are lower than transmission requirements of the first type of QoS for the second message type and
the first type of QoS is defined by at least one of:
packet loss rate, packet delay budget, scheduling weights, admission thresholds, queue management thresholds, link layer protocol configuration, or reliability and throughput.

12. The method of claim 2, wherein LCs on the first SRB comprise any one of:
an uplink dedicated control channel (DCCH) or in an uplink dedicated control channel specific (DCCH-S);
a downlink DCCH or in a downlink DCCH-S; or
a sidelink control channel (SCCH) or in a sidelink DCCH-S using the first SRB.

13. The method of claim 5, wherein LCs on the first DRB comprise any one of:
uplink dedicated traffic channel (DTCH) or in an uplink dedicated traffic channel specific (DTCH-S);
a downlink DTCH or in a downlink DTCH-S; and
a sidelink traffic channel (STCH) or in a sidelink traffic channel specific (STCH-S).

14. The method of claim 1, the method further comprising:
communicating, by the first communication device, a configuration mode on the RB, wherein the configuration mode comprises any one of:
acknowledged mode (AM) to a radio link control (RLC) entity to enable automatic repeat request (ARQ);
unacknowledged mode (UM) to the RLC entity to disable ARQ; or
transparent mode (TM) to the RLC entity to disable ARQ.

15. A communication device comprising:
at least one processor; and
a non-transitory computer readable storage medium, coupled to the at least one processor, storing programming for execution by the at least one processor, to cause the communication device to:
generate a first message only within a radio access network (RAN) of a wireless communication network; and
communicate the first message, via a transceiver, in a radio bearer (RB) with a second communication device within the RAN, wherein the first message is communicated without performing hybrid automatic repeat request (HARQ),
the first message being associated with a first message type, a priority of the first message type being lower than a priority of a second message having a second message type communicated via a core network (CN) of the wireless communication network, and
wherein the first message is any one of control signaling or data.

16. The communication device of claim 15, wherein the first message is the control signaling, the programming for execution by the at least one processor further causes the communication device to transmit the first message in a first signaling radio bearer (SRB), and the first SRB is one of a dedicated SRB or a group common SRB.

17. The communication device of claim 16, wherein a priority of the first SRB is configured to be lower than a priority of any one of SRB0 to SRB3.

18. A non-transitory computer readable memory, comprising instructions stored thereon to cause a communication device to perform operations, the operations comprising:
generating a first message in a first communication device only within a radio access network (RAN) of a wireless communication network; and
communicating, by the first communication device, the first message in a radio bearer (RB) with a second communication device within the RAN, wherein the first message is communicated without performing hybrid automatic repeat request (HARQ),
the first message being associated with a first message type, a priority of the first message type being lower than a priority of a second message having a second message type communicated via a core network (CN) of the wireless communication network, and
wherein the first message is any one of control signaling or data.

* * * * *